US 12,445,701 B2

(12) United States Patent
Rho et al.

(10) Patent No.: US 12,445,701 B2
(45) Date of Patent: Oct. 14, 2025

(54) CAMERA MODULE AND ELECTRONIC DEVICE INCLUDING THE SAME

(71) Applicant: Samsung Electronics Co., Ltd., Suwon-si (KR)

(72) Inventors: Hyungjin Rho, Suwon-si (KR); Bongchan Kim, Suwon-si (KR); Jaeheung Park, Suwon-si (KR); Kwangseok Byon, Suwon-si (KR); Hyosang An, Suwon-si (KR); Jonghoon Won, Suwon-si (KR); Min Heu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 18/146,810

(22) Filed: Dec. 27, 2022

(65) Prior Publication Data

US 2023/0156307 A1 May 18, 2023

Related U.S. Application Data

(63) Continuation of application No. PCT/KR2022/015257, filed on Oct. 11, 2022.

(30) Foreign Application Priority Data

Nov. 17, 2021 (KR) .................. 10-2021-0158252
Jan. 5, 2022 (KR) .................. 10-2022-0001767

(51) Int. Cl.
*H04N 23/51* (2023.01)
*G03B 17/02* (2021.01)
(Continued)

(52) U.S. Cl.
CPC ............. *H04N 23/51* (2023.01); *G03B 17/02* (2013.01); *H04N 23/54* (2023.01); *H04N 23/55* (2023.01)

(58) Field of Classification Search
CPC ........ H04N 23/60; H04N 23/58; H04N 23/57; H04N 23/00; H04N 23/55; H04N 23/54;
(Continued)

(56) References Cited

U.S. PATENT DOCUMENTS 11,539,864 B1 * 12/2022 Sharma .................. G03B 17/17
2014/0375875 A1   12/2014 Yeo
(Continued)

FOREIGN PATENT DOCUMENTS

CN        108427166 A      8/2018
KR  10-2014-0014787 A      2/2014
(Continued)

OTHER PUBLICATIONS

Extended European Search Report dated Mar. 11, 2024, issued in European Patent Application No. 22871132.1.
(Continued)

*Primary Examiner* — Xi Wang
(74) *Attorney, Agent, or Firm* — Jefferson IP Law, LLP

(57) ABSTRACT

A camera module and an electronic device including the same are provided. The camera module and an electronic device include a camera housing, a barrel structure including at least one lens aligned along a first optical axis direction, the barrel structure being at least partially accommodated in the camera housing, a guide unit configured to guide the barrel structure to reciprocate along the first optical axis direction or reciprocate in a plane intersecting the first optical axis, a driving unit axis, a reflective member configured to refract or reflect light incident through the at least one lens in a second optical axis direction intersecting the first optical axis, and an image sensor disposed on the camera housing, aligned with the reflective member in the second optical axis direction, and configured to receive the light refracted or reflected by the reflective member.

15 Claims, 18 Drawing Sheets

(51) Int. Cl.
  *H04N 23/54* (2023.01)
  *H04N 23/55* (2023.01)
(58) Field of Classification Search
  CPC .... H04N 23/51; H04N 5/2257; H04N 5/2252; H02K 33/18; G03B 30/00; G03B 5/00; G03B 2205/0069; G03B 17/02; G03B 17/12; G02B 13/0075
  See application file for complete search history.

(56) References Cited

U.S. PATENT DOCUMENTS

| | | |
|---|---|---|
| 2015/0049209 A1 | 2/2015 | Hwang et al. |
| 2018/0234529 A1 | 8/2018 | Yu et al. |
| 2018/0356645 A1 | 12/2018 | Jeong et al. |
| 2019/0212632 A1 | 7/2019 | Miller et al. |
| 2020/0174232 A1 | 6/2020 | Goldenberg et al. |
| 2021/0215903 A1 | 7/2021 | Rho et al. |

FOREIGN PATENT DOCUMENTS

| | | |
|---|---|---|
| KR | 10-2014-0058450 A | 5/2014 |
| KR | 10-2014-0128906 A | 11/2014 |
| KR | 10-2015-0058784 A | 5/2015 |
| KR | 10-2015-0080694 A | 7/2015 |
| KR | 10-2015-0118012 A | 10/2015 |
| KR | 10-1892857 B1 | 8/2018 |
| KR | 10-2021-0034400 A | 3/2021 |
| KR | 10-2021-0059681 A | 5/2021 |
| KR | 10-2021-0086417 A | 7/2021 |
| KR | 10-2021-0090527 A | 7/2021 |
| KR | 10-2303499 B1 | 9/2021 |

OTHER PUBLICATIONS

International Search Report dated Jan. 13, 2023, issued in International Patent Application No. PCT/KR2022/015257.
Indian Office Action dated Jan. 22, 2025; Indian Appln. No. 202317013337.
Chinese Office Action with English translation dated Jul. 29, 2025; Chinese Appln. No. 202280006770.X.

\* cited by examiner

CAMERA MODULE AND ELECTRONIC DEVICE INCLUDING THE SAME

CROSS-REFERENCE TO RELATED APPLICATION(S)

This application is a continuation application, claiming priority under § 365 (c), of an International application No. PCT/KR2022/015257, filed on Oct. 11, 2022, which is based on and claims the benefit of a Korean patent application number 10-2021-0158252, filed on Nov. 17, 2021, in the Korean Intellectual Property Office, and of a Korean patent application number 10-2022-0001767, filed on Jan. 5, 2022, in the Korean Intellectual Property Office, the disclosure of each of which is incorporated by reference herein in its entirety.

BACKGROUND

1. Field

The disclosure relates to an optical device, for example, a camera module and an electronic device including the same. More particularly, the disclosure relates to a camera module in which a focus adjustment function and/or an image stabilization function are implemented while providing improved telephoto performance, and/or an electronic device including the camera module.

2. Description of Related Art

Typically, an electronic device may mean a device that performs a specific function according to a program provided therein (e.g., an electronic scheduler, a portable multimedia reproducer, a mobile communication terminal, a tablet personal computer (PC), an image/sound device, a desktop/laptop PC, or a vehicle navigation system), as well as a home appliance. The above-mentioned electronic devices may output, for example, information stored therein as sound or an image. With the increase of degree of integration of electronic devices and the generalization of ultra-high-speed and high-capacity wireless communication, recently, a single electronic device, such as a mobile communication terminal, may be provided with multiple functions. For example, various functions, such as an entertainment function, such as gameplay, a multimedia function, such as music/video playback, a communication and security function for mobile banking or the like, and/or a schedule management or e-wallet function, are integrated in a single electronic device, in addition to a communication function.

With the development of digital camera manufacturing technology, electronic devices equipped with small and lightweight camera modules have been commercialized. As an electronic device (e.g., a mobile communication terminal) that is generally carried at all times is equipped with a camera module, it becomes possible for a user to easily utilize various functions, such as video call or augmented reality as well as to take a picture or video.

In recent years, electronic devices including a plurality of cameras have been distributed. An electronic device may include, for example, a camera module including a wide-angle camera and a telephoto camera. The electronic device may acquire a wide-angle image by photographing a wide-range scene around the electronic device by using the wide-angle camera, or may acquire a telephoto image by photographing a scene corresponding to a location relatively far from the electronic device by using the telephoto camera. In this way, by including a plurality of camera modules or lens assemblies, miniaturized electronic devices, such as smartphones are making inroads into the compact camera market, and are expected to replace high-performance cameras, such as single-lens reflex cameras in the future.

The above information is provided as background information only to assist with an understanding of the disclosure. No determination has been made, and no assertion is made, as to whether any of the above might be applicable as prior art with regard to the disclosure.

SUMMARY

In a miniaturized electronic device including a plurality of camera modules, a camera including a folded optics system may be useful for extending or enlarging a focal length. In a folded camera, since a reflective member (or a refractive member), such as a prism or a mirror is disposed, the direction in which the lenses are arranged may be freely designed or disposed regardless of the direction in which external light is incident. Accordingly, the folded camera may be useful for improving telephoto performance while being mounted on a miniaturized electronic device. Such a folded camera may be configured, for example, as disclosed in Korean Patent Application Laid-Open No. 10-2021-0086417 (published on Jul. 8, 2021) or U.S. Patent Application Publication No. 2021/0199918 (published on Jul. 1, 2021). In the camera module disclosed through this patent publication(s), a prism is located on the subject side rather than lens(es) and may execute an optical image stabilization function through two-axis rotational driving.

However, in a structure in which a reflective member, such as a prism is disposed on the subject side rather than the lens(s), the size of the reflective member may be increased in order to ensure that the camera module secures a sufficient amount of light. For example, a camera module having a structure in which the reflective member is disposed on the subject side rather than the lens(es) may be difficult to be mounted in a miniaturized electronic device. As in the aforementioned patent publication(s), when a driving mechanism for moving a prism is included in the camera module for optical image stabilization, the size or power consumption of the driving mechanism may increase as the prism becomes larger, and it may be difficult to mount the prism in a miniaturized electronic device.

Aspects of the disclosure are to address at least the above-mentioned problems and/or disadvantages and to provide at least the advantages described below. Accordingly, an aspect of the disclosure is to provide a camera module that is easy to miniaturize while implementing a telephoto function, and/or an electronic device including the camera module.

Another aspect of the disclosure is to provide a camera module in which a focus adjustment function and/or an image stabilization function are implemented while providing improved telephoto performance, and/or an electronic device including the camera module.

Additional aspects will be set forth in part in the description which follows and, in part, will be apparent from the description, or may be learned by practice of the presented embodiments.

In accordance with an aspect of the disclosure, a camera module is provided. The camera module includes a camera housing, a barrel structure including at least one lens aligned along a first optical axis direction, the barrel structure being at least partially accommodated in the camera housing, a guide unit at least partially accommodated in the camera housing and configured to guide the barrel structure to reciprocate along the first optical axis direction or reciprocate in a plane intersecting a first optical axis, a driving unit including at least one coil and at least one magnet disposed to at least partially face the at least one coil in a direction intersecting the first optical axis, a reflective member at least partially accommodated in the camera housing and configured to refract or reflect light incident through the at least one lens in a second optical axis direction intersecting the first optical axis, and an image sensor disposed on the camera housing, aligned with the reflective member in the second optical axis direction, and configured to receive the light refracted or reflected by the reflective member. The at least one coil or the at least one magnet may be disposed at a position at least partially facing the reflective member in a direction intersecting the first optical axis.

In accordance with another aspect of the disclosure, an electronic device is provided. The electronic device includes at least one processor and a camera module. The camera module includes a camera housing, a barrel structure including at least one lens aligned along a first optical axis direction, the barrel structure being at least partially accommodated in the camera housing, a guide unit at least partially accommodated in the camera housing and configured to guide the barrel structure to reciprocate along the first optical axis direction or reciprocate in a plane intersecting the first optical axis, a driving unit including at least one coil and at least one magnet disposed to at least partially face the at least one coil in a direction intersecting the first optical axis, a reflective member at least partially accommodated in the camera housing in a state of at least partially facing the at least one coil or the at least one magnet in a direction intersecting the first optical axis, the reflective member being configured to refract or reflect light incident through the at least one lens in a second optical axis direction intersecting the first optical axis, and an image sensor disposed on the camera housing, aligned with the reflective member in the second optical axis direction, and configured to receive the light refracted or reflected by the reflective member. The at least one processor may be configured to apply an electric signal to the at least one coil to make the guide unit and the barrel structure reciprocate in the first optical axis direction or to make the barrel structure reciprocate with respect to the guide unit in a plane intersecting the first optical axis, and to acquire a subject image based on light received by the image sensor.

In accordance with another aspect of the disclosure, a camera module is provided. The camera module includes a camera housing, a barrel structure comprising at least one lens aligned along a first optical axis direction and at least partially accommodated in the camera housing, a guide unit at least partially accommodated in the camera housing and configured to guide the barrel structure to reciprocate along the first optical axis direction or reciprocate in a plane intersecting the first optical axis, a driving unit including at least one coil and at least one magnet disposed to at least partially face the at least one coil in a direction intersecting the first optical axis, a reflective member at least partially accommodated in the camera housing and configured to refract or reflect light incident through the at least one lens in a second optical axis direction intersecting the first optical axis, and an image sensor disposed on the camera housing, aligned with the reflective member in the second optical axis direction, and configured to receive the light refracted or reflected by the reflective member. The driving unit includes a first coil provided as one of the at least one coil and disposed on the camera housing, a first magnet provided as one of the at least one magnet and disposed on the guide unit, at least one second coil provided as one of the at least one coil and disposed on the camera housing or the guide unit, and at least one second magnet provided as another one of the at least one magnet and disposed on the barrel structure. The driving unit may be configured to generate a driving force for making the guide unit reciprocate in the first optical axis direction based on an electric signal applied to the first coil, and to generate a driving force for making the barrel structure reciprocate in a plane intersecting the first optical axis based on an electric signal applied to the at least one second coil. The barrel structure may be configured to reciprocate in the first optical axis direction together with the guide unit or to reciprocate in a plane intersecting the first optical axis under the guidance of the guide unit, and the reflective member may be at least partially disposed between the first coil and the at least one second coil, or may be disposed between the image sensor and the at least one second coil.

According to various embodiments of the disclosure, by disposing a reflective member between an array of lens(es) and an image sensor, it may be possible to secure the amount of light of a camera module substantially by the lens(es). For example, by reducing the influence of the size of the reflective member on the amount of light of the camera module, it may be easy to miniaturize the camera module. According to an embodiment of the disclosure, by disposing the reflective member between the array of lens(es) and the image sensor, it may be easy to increase the back focal length of the lens(es) so that the telephoto performance of the camera module may be improved. In another embodiment of the disclosure, by disposing a driving unit capable of driving the lens(es) behind the lens(es) or at a position that at least partially overlaps the reflective member. As a result, it may be easy to implement a focus adjustment function or an optical image stabilization function while minimizing the camera module and/or the electronic device including the same. In addition, various effects recognized directly or indirectly through this document may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and configurations may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
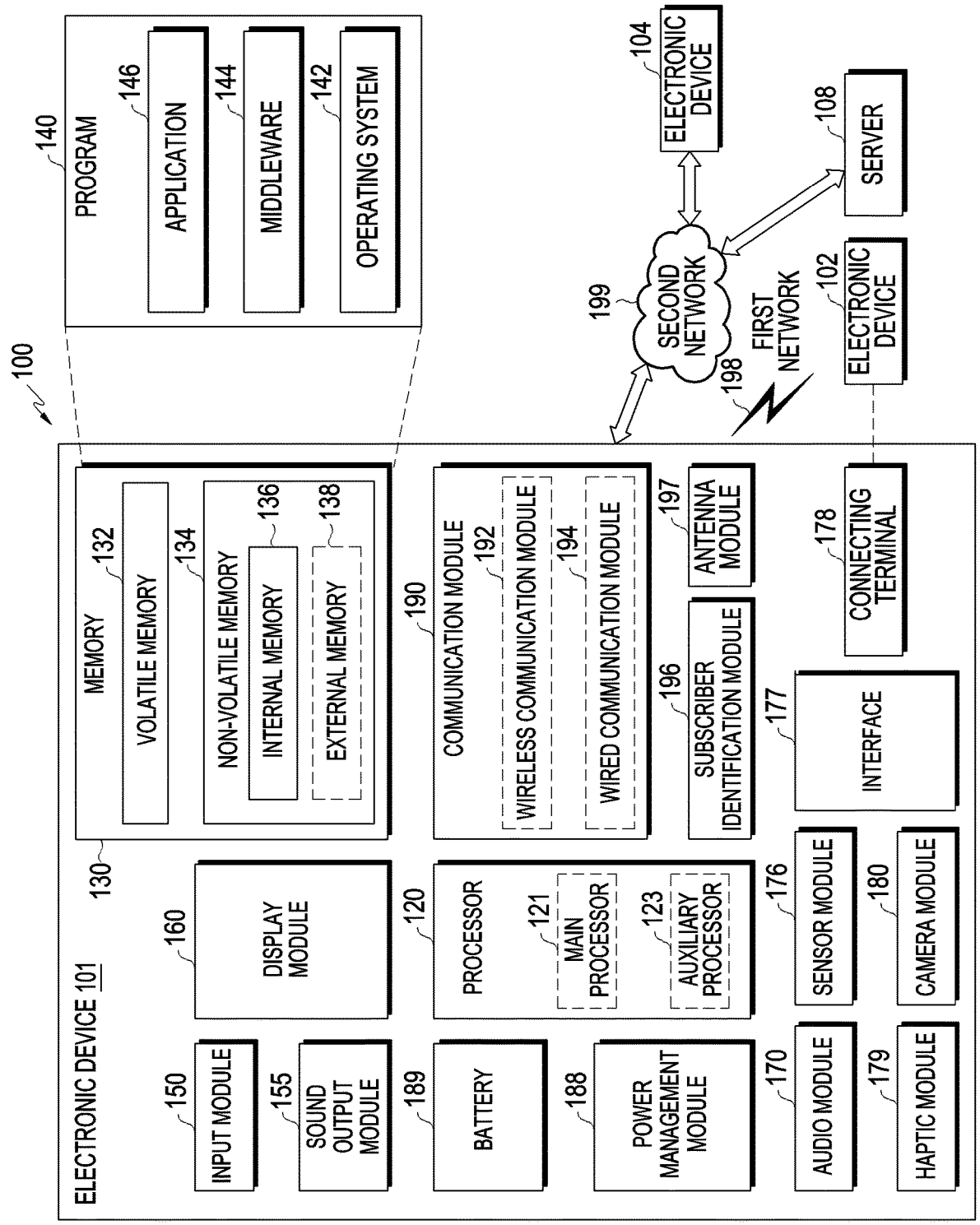
FIG. 1 is a block diagram illustrating an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., the external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
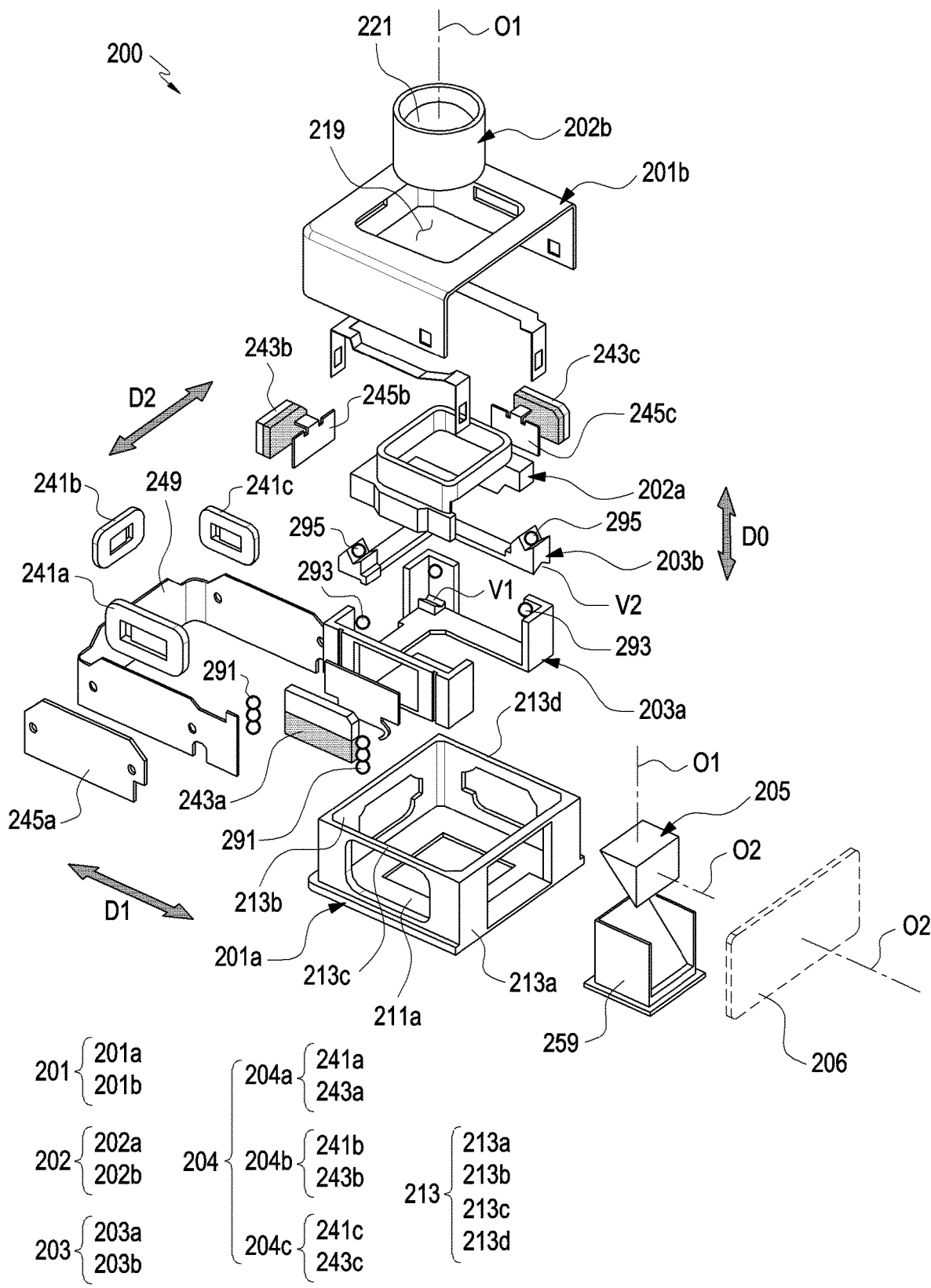
FIG. 2 is an exploded perspective view illustrating a camera module according to an embodiment of the disclosure.

FIG. 2 is an exploded perspective view illustrating a camera module according to an embodiment of the disclosure.

Figure 3:
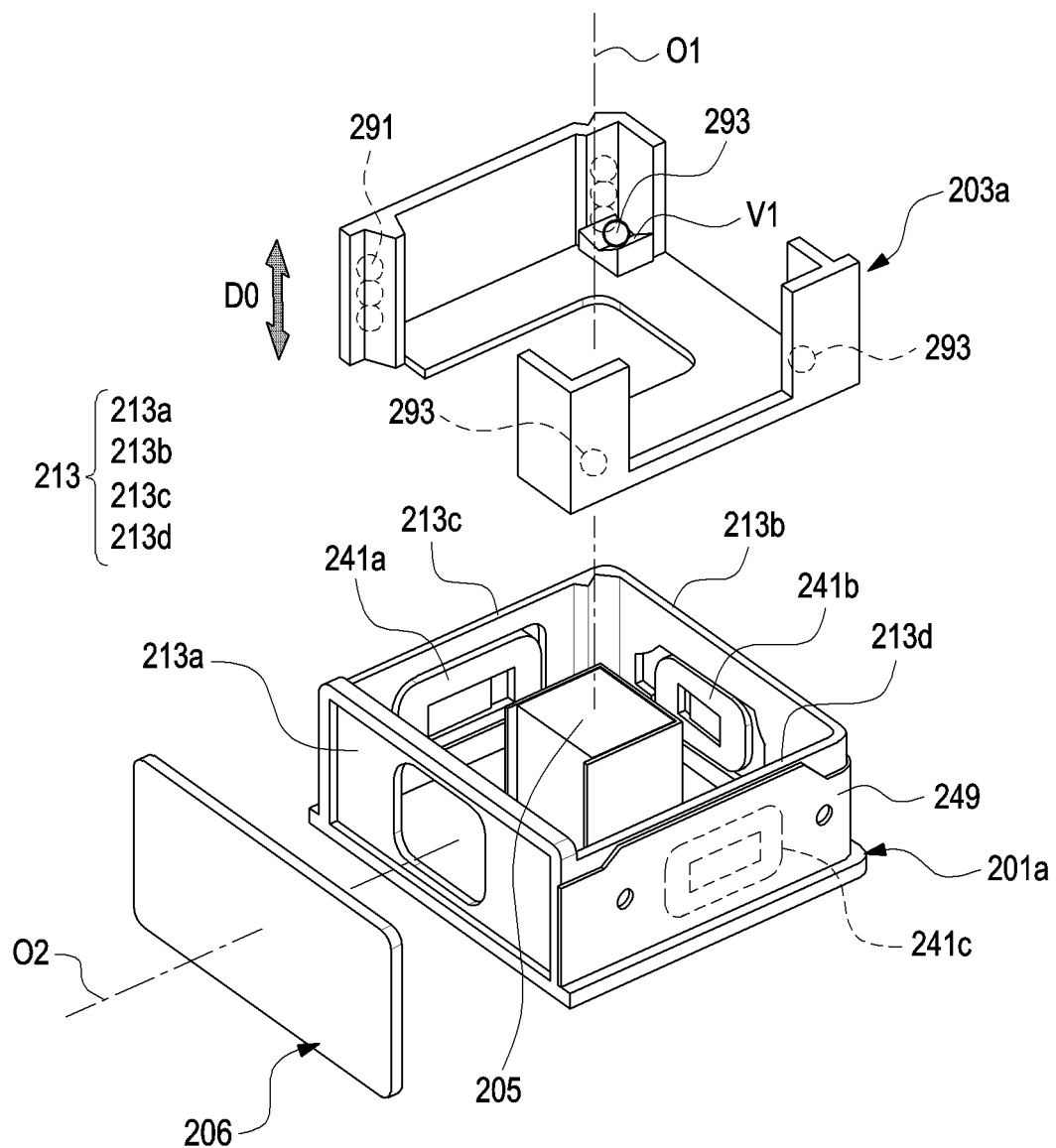
FIG. 3 is an exploded perspective view illustrating a structure in which a guide unit and/or a driving unit are disposed in a camera module according to an embodiment of the disclosure.

FIG. 3 is an exploded perspective view illustrating a structure in which a guide unit and/or a driving unit are disposed in a camera module according to an embodiment of the disclosure.

Figure 4:
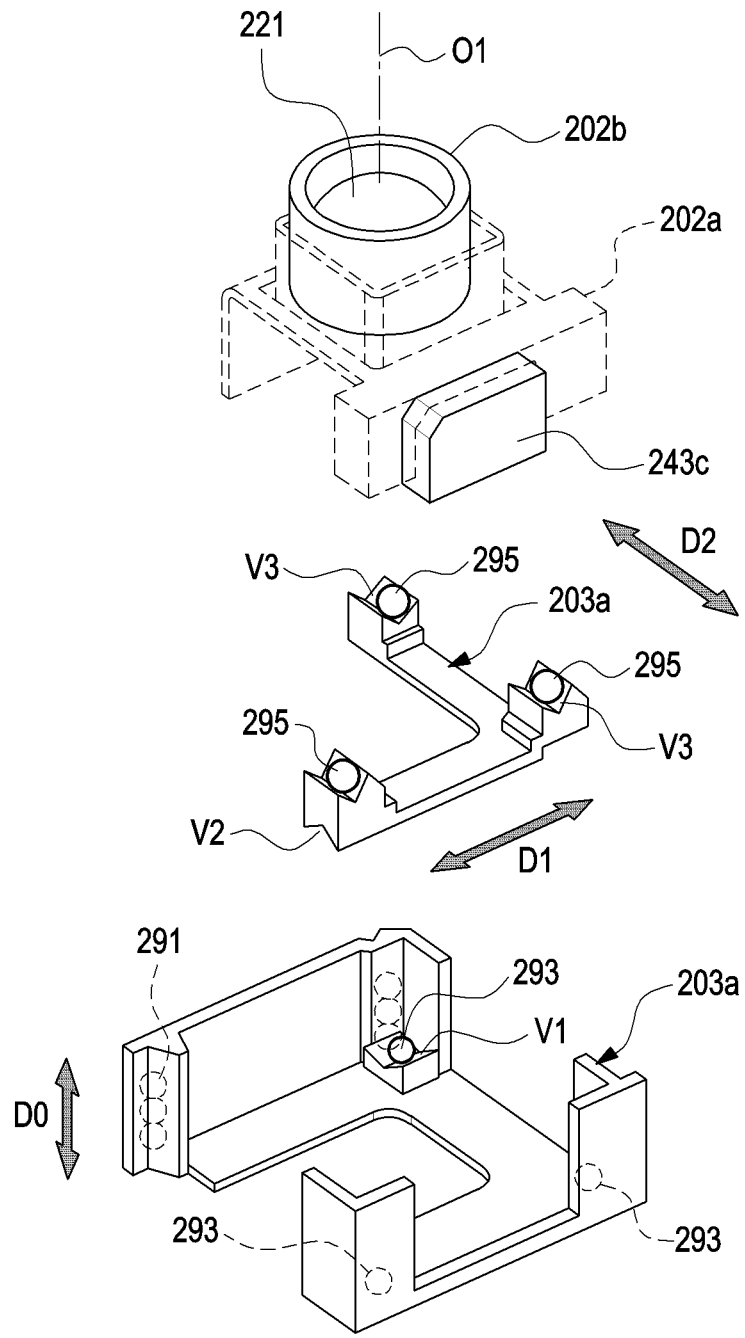
FIG. 4 is an exploded perspective view illustrating a structure of a guide unit in a camera module according to an embodiment of the disclosure.

FIG. 4 is an exploded perspective view illustrating a structure of a guide unit in a camera module according to an embodiment of the disclosure.

Referring to FIGS. 2 to 4, the camera module 200 according to various embodiments may include a camera housing 201, a barrel structure 202, a guide unit 203, a driving unit 204, a reflective member 205, and/or an image sensor 206. According to an embodiment of the disclosure, the reflective member 205 may reflect or refract light incident in the first optical axis O1 direction through the barrel structure 202 (e.g., the lens(es) 221) in the second optical axis O2 direction so as to guide or focus the light to the image sensor 206. In another embodiment of the disclosure, the barrel structure 202 may reciprocate along the first optical axis O1 direction (e.g., the direction D1) together with the guide unit 203 on the camera housing 201, and may reciprocate with respect to at least a portion of the guide unit 203 in a plane intersecting the first optical axis O1. For example, the barrel structure 202 may execute at least focus adjustment by reciprocating along the first optical axis O1 direction, and may execute an optical image stabilization operation by horizontally moving in a plane intersecting the first optical axis O1. In another embodiment of the disclosure, the driving unit 204 may generate a driving force for moving the barrel structure 202 in the first optical axis O1 direction and/or in a plane intersecting the first optical axis O1, and may be disposed to at least partially face or overlap the reflective member 205 in a direction intersecting the first optical axis O1. Here, the "plane intersecting the first optical axis O1" may include a plane substantially perpendicular to the first optical axis O1.

According to various embodiments of the disclosure, the camera housing 201 may include a base member 201a and a cover member 201b, and may substantially configure the exterior of the camera module 200. For example, the camera housing 201 may serve as a structure in which an optical component, such as the barrel structure 202 or the reflective member 205, and an electrical/electronic component, such as the image sensor 206 or the driving unit 204, are accommodated or disposed. According to an embodiment of the disclosure, if there is a component that generates an electromagnetic wave among the components accommodated therein, the camera housing 201 may at least partially provide an electromagnetic shield structure. For example, the driving unit 204 may include a voice coil configured to generate a driving force by using an electric or magnetic field, and at least one of the base member 201a and the cover member 201b may provide an electromagnetic shield structure. In some embodiments of the disclosure, the base member 201 may provide a structure configured to arrange components accommodated therein, and the cover member 201b may be coupled to substantially wrap the base member 201a. For example, when the camera housing 201 has a structure that provides an electromagnetic shield structure, the cover member 201b rather than the base member 201a may be useful in forming the electromagnetic shield structure.

According to various embodiments of the disclosure, the base member 201a may have a structure including a bottom surface 211a and a plurality of side walls 213, wherein the plurality of side walls 213 may extend from the edges of the bottom surface 211a along the first optical axis O1 in a plane direction, and the upper portion of the base member 201a may have a substantially open structure. Although reference numerals are assigned in the drawings, either the bottom surface 211a or the side wall(s) 213 may provide a penetration area(s), which may be used as an assembly space(s) in which the driving unit 204 or the image sensor 206 and/or the reflective member 205 may be disposed. In an embodiment of the disclosure, the cover member 201b may at least partially close the upper portion of the base member 201a, and may have a shape wrapping at least one of the side walls 213 of the base member 201a. In another embodiment of the disclosure, the cover member 201b may provide an opening region 219 disposed on the top of the base member 201a. The opening region 219 may provide, for example, a path through which external light is incident on the camera module 200 or a space in which the barrel structure 202 is located. Of the light incident on the camera module 200 from the outside, light guided or focused by the barrel structure 202 may be substantially detected by the image sensor 206. In the illustrated embodiment of the disclosure, the cover member 201b may have a structure that wraps includes two side walls among the side walls 213 that face each other (e.g., the third side wall 213c and the fourth side wall 213d) and/or the second side wall 213b, and in some embodiments of the disclosure, the cover member 201b may have a structure that further wraps the first side wall 213a and the image sensor 206 in the state in which the image sensor 206 is disposed. In another embodiment of the disclosure, the cover member 201b may have a structure that wraps the first side wall 213a and the second side wall 213b. For example, the cover member 201b may be coupled to wrap at least two side walls facing each other among the side walls 213 of the base member, and may be coupled to wrap two or four side walls in some embodiments. As will be described later, as the cover member 201b is coupled, a flexible printed circuit board 249 or the image sensor 206 may be disposed on or fixed to the outer peripheral surfaces of the side walls 213.

According to various embodiments of the disclosure, the barrel structure 202 may include at least one lens 221 aligned along the first optical axis O1 direction, and may be at least partially accommodated in the camera housing 201. The at least one lens 221 may guide or focus light incident on the reflective member 205 from the outside, and an appropriate number of lenses 221 may be disposed according to specifications required by the camera module 200 or an electronic device (e.g., the electronic device 101 in FIG. 1). According to an embodiment of the disclosure, the barrel structure 202 may include a barrel 202b and a barrel base 202a, and may be disposed on the guide unit 203 to reciprocate along the first optical axis O1 direction in the camera housing 201 or reciprocate in a plane intersecting the first optical axis O1. For example, the barrel structure 202 may reciprocate in the first optical axis O1 direction (e.g., direction DO) to adjust the focus or the focal length, and to reciprocate in a plane intersecting the first optical axis O1 to execute an image stabilization operation. The behavior of the barrel structure 202 may depend on the guidance or operation of the guide unit 203 and/or the driving unit 204, and will be described through the description made with reference to FIG. 7 or 8.

According to various embodiments of the disclosure, the guide unit 203 may be configured to guide the barrel structure 202 to reciprocate with respect to the camera housing 201 along the first optical axis O1 direction, and/or to reciprocate in a plane intersecting the first optical axis O1. According to an embodiment of the disclosure, the guide unit 203 may include a first guide member 203a and a second guide member 203b. For example, the first guide member 203a may be disposed to linearly reciprocate in the camera housing 201 in the first optical axis O1 direction (e.g., the direction DO), and the second guide member 203b may be disposed on the first guide member 203a to linearly reciprocate in the first direction D1. In an embodiment of the disclosure, the first guide member 203a may have a shape that at least partially extends in the first optical axis O1 direction, and the second guide member 203b may have a frame shape or an L-shape while having a flat plate shape and may be disposed at least partially parallel to a plane intersecting the first optical axis O1. The barrel structure 202 (e.g., the barrel base 202a) may be disposed on the second guide member 203b to linearly reciprocate in the second direction D2. Here, the first direction D1 and the second direction D2 may be substantially perpendicular to the first optical axis O1 or may be substantially parallel to a plane intersecting the first optical axis O1. In another embodiment of the disclosure, the first direction D1, the second direction D2, and/or the first optical axis O1 may be disposed to be inclined with respect to each other at an angle other than vertical.

According to various embodiments of the disclosure, the first guide member 203a may be disposed such that at least a portion of the outer surface thereof faces the inner surface of the camera housing 201, and may linearly reciprocate in the first optical axis O1 direction in the camera housing 201. In an embodiment of the disclosure, the camera module 200 may include first guide balls 291 to reduce frictional force generated in the linear reciprocating of the first guide member 203a. For example, by disposing the first guide balls 291, a predetermined gap may be provided between the outer surface of the first guide member 203a and the inner surface of the camera housing 201, and due to the rolling of the first guide balls 291, the linear reciprocating of the first guide member 203a with respect to the camera housing 201 may be smoothened. In another embodiment of the disclosure, the plurality of first guide balls 291 may be arranged along the first optical axis O1 direction, and the first guide balls 291 may be arranged to form a plurality of rows (e.g., two rows). In some embodiments of the disclosure, the outer surface of the first guide member 203a or the inner surface of the camera housing 201 (e.g., the base member 201a) may include a V-groove-shaped rail structure, and the first guide balls 291 may be at least partially accommodated in the rail structure. Since the rail structure between the first guide member 203a and the camera housing 201 extends along the first optical axis O1 direction, the first guide member 203a may be movable substantially along the first optical axis O1 direction in the camera housing 201 but may be restricted in movement in other directions.

According to various embodiments of the disclosure, the second guide member 203b may have a frame shape or an L-shape, and may be disposed on the first guide member 203a in a state substantially parallel to a plane intersecting the first optical axis O1 to reciprocate in the first direction D1. For example, the second guide member 203b may reciprocate with respect to the first guide member 203a in the first direction D1 intersecting the first optical axis O1 while reciprocating in the first optical axis O1 direction together with the first guide member 203a. According to an embodiment of the disclosure, by including the plurality of second guide balls 293, the camera module 200 may smoothen the reciprocating of the second guide member 203b with respect to the first guide member 203a. For example, by disposing the second guide balls 293, a predetermined gap may be provided between the second guide member 203b and the first guide member 203a, and due to the rolling of the second guide balls 293, the linear reciprocating of the second guide member 203b with respect to the first guide member 203a may be smoothened. In another embodiment of the disclosure, at least three second guide balls 293 may be disposed to support the second guide member 203b in a state substantially parallel to a plane intersecting the first optical axis O1. In some embodiments of the disclosure, the first guide member 203a and the second guide member 203b may include a V-recess-shaped first rail structure (e.g., a V-recess indicated as "V1" or "V2") having a predetermined length at a predetermined position, and the second guide balls 293 may be at least partially accommodated in the first rail structure. The first rail structure between the first guide member 203a and the second guide member 203b may extend along the first direction D1, whereby the second guide member 203b may be movable on the first guide member 203a substantially along the first direction D1, but may be restricted in movement in other directions.

According to various embodiments of the disclosure, the barrel structure 202 (e.g., the barrel base 202a) may be disposed on the second guide member 203b and may reciprocate with respect to the second guide member 203b along a second direction D2 substantially parallel to a plane intersecting the first optical axis O1. For example, the barrel base 202a may reciprocate in the first direction D1 intersecting the first optical axis O1 together with second guide member 203b while reciprocating in the first optical axis direction O1 the first guide member 203a and the second guide member 203b, and may reciprocate with respect to the second guide member 203b in the second direction D2 intersecting the first optical axis O1 and/or the first direction D1. According to an embodiment of the disclosure, by including the plurality of third guide balls 295, the camera module 200 may smoothen the reciprocating of the barrel base 202a with respect to the second guide member 203b (e.g., the reciprocating in the second direction D2). For example, by disposing the third guide balls 295, a predetermined gap may be provided between the barrel base 202a and the second guide member 203b, and due to the rolling of the third guide balls 295, the linear reciprocating of the barrel base 202a with respect to the second guide member 203b may be smoothened. In another embodiment of the disclosure, at least three third guide balls 295 may be disposed to support the barrel base 202a in a state substantially parallel to a plane intersecting the first optical axis O1. In some embodiments of the disclosure, the barrel base 202a and/or the second guide member 203b may include a V-groove-shaped second rail structure (e.g., the groove indicated "V3") having a predetermined length at a predetermined position, and the third guide balls 295 may be at least partially accommodated in the second rail structure. The second rail structure between the barrel base 202a and the second guide member 203b may extend along the second direction D2, whereby the barrel base 202a may be movable on the second guide member 203b substantially along the second direction D2, but may be restricted in movement in other directions.

In this way, while being guided by the guide unit 203 or together with the guide unit 203, the barrel structure 202 may reciprocate on the camera housing 201 in the first optical axis O1 and may reciprocate in the plane intersecting the first optical axis O1 along at least two directions (e.g., the first direction D1 and the second direction D2). When the barrel structure 202 or the lens 221 moves in the first optical axis O1 direction, a focus adjustment operation or a focal length adjustment operation may be implemented, when the barrel structure 202 or the lens 221 moves in a plane intersecting the first optical axis O1, an optical image stabilization operation may be implemented. An electronic device (e.g., the electronic device 101 in FIG. 1) or a processor (e.g., the processor 120 in FIG. 1) may detect the vibration of the camera module 200 or the electronic device by an external force by using a sensor module (e.g., the sensor module 176 of FIG. 1), such as a gyro sensor, and may cause the barrel structure 202 or the lens 221 to reciprocate along the first optical axis O1 direction and/or a plane intersecting the first optical axis O1 based on the vibration detected by the sensor module. For example, by moving the barrel structure 202 in the opposite direction to the vibration direction due to an external force, it is possible to prevent deterioration of the quality of a photographed image due to vibration, such as a user's hand shake. The processor may control the driving unit 204 to generate a driving force for making the barrel structure 202 reciprocate. The driving unit 204 may include, for example, coils 241a, 241b, and 241c, and, based on the description "control the driving unit 204," it may be understood that an electric signal is applied to the coils 241a, 241b, and 241c.

According to various embodiments of the disclosure, the driving unit 204 may include a first driving unit 204a configured to control a focus adjustment operation, and at least one second driving unit 204b and 204c configured to control an image stabilization operation. In some embodiments of the disclosure, a plurality of second driving units 204b and 204c may be provided for the image stabilization operation. In the detailed description below, a coil for the image stabilization operation may be referred to as "(a plurality of) second driving units 204b and 204c," and if necessary, the plurality of second driving units 204b and 204c for the image stabilization operation may be separately described as a "second driving unit 204b" and a "third driving unit 204c."

According to various embodiments of the disclosure, the first driving unit 204a may include a first coil 241a disposed on the camera housing 201, and a guide unit 203 (e.g., a first guide member 203a) or a first magnet 243a disposed on the barrel structure 202 (e.g., the barrel base 202a). The first driving unit 204a may generate, for example, a driving force for moving the first guide member 203a in the first optical axis O1 direction, and the first magnet 243a may be disposed on the first guide member 203a. According to an embodiment of the disclosure, the first coil 241a may be at least partially accommodated in a penetration area in the third side wall 213c among the side walls, and may be disposed to be exposed inside the third side wall 213c and to directly face the first magnet 243a. Like the third side wall 213c, the first guide member 203a may also include a penetration area that accommodates at least a portion of the first magnet 243a. For example, by accommodating at least a portion of the first coil 241a or the first magnet 243a by using the penetration area(s), it is possible to reduce a space occupied by the coils 241a, 241b, and 241c or magnets 243a, 243b, and 243c in the camera module 200.

According to various embodiments of the disclosure, the first coil 241a and the first magnet 243a may be disposed to substantially face each other in a direction intersecting the first optical axis O1. In some embodiments of the disclosure, when viewed from the first coil 241a, the first magnet 243a may be a dipole magnet having an N pole and an S pole arranged along the first optical axis O1 direction. For example, like a Lorentz-type voice coil motor, when an electric signal is applied to the first coil 241a, the electric field of the first coil 241a and the magnetic field of the first magnet 243a may interact to generate a shearing force. Accordingly, when the first coil 241a is fixed to the camera housing 201, the first magnet 243a and/or the first guide member 203a may execute a focus adjustment operation or a focal length adjustment operation while moving in the first optical axis O1 direction. It has been previously described that by disposing the first guide balls 291, the first guide member 203a is smoothly movable with respect to the camera housing 201.

According to various embodiments of the disclosure, the second driving unit 204b may include a second coil 241b disposed on the camera housing 201 (e.g., the second side wall 213b among the side walls 213) and a second magnet 243b disposed on the barrel base 202a, and the third driving unit 204c may include a third coil 241c disposed on the camera housing 201 (e.g., the fourth side wall 213d among the side walls 213) and a third magnet 243b disposed on the barrel base 202a. For convenience of description, in the following detailed description, it may be described that "the second driving unit 204b is disposed on the second side wall 213b, and the third driving unit 204c is disposed on the fourth side wall 213d." The fourth side wall 213d may be, for example, a side wall disposed to face the third side wall 213c, and the second side wall 213b may be configured to interconnect one end of the third side wall 213c and one end of the fourth side wall 213d. As will be described later, the image sensor 206 may be disposed on the first side wall 213a among the side walls 213, and the reflective member 205 may be at least partially disposed between the first driving unit 204a and the first driving unit 204a the camera housing 201 and/or between the second driving unit 204b and the image sensor 206 within the camera housing 201. For example, the first driving unit 204a or the third driving unit 204c may be disposed to at least partially overlap or face the reflective member 205 in a direction intersecting the first optical axis O1 (e.g., the second direction D2), and in some embodiments of the disclosure, the second driving unit 204b or the image sensor 206 may be disposed to at least partially overlap or face the reflective member 205 in a direction intersecting the first optical axis O1 (e.g., the first direction D1).

According to various embodiments of the disclosure, the second driving unit 204b and the third driving unit 204c may have substantially the same configuration, except that the coils 241b and 241c and the magnets 243b and 243c are different from each other in arrangement directions. For example, the second coil 241b and the second magnet 243b may be disposed to face each other in the first direction D1 intersecting the first optical axis O1, and the third coil 241c and the third magnet 243c may be disposed to face each other in the second direction D2 intersecting the first direction D1 while intersecting the first optical axis O1. In various embodiments of the disclosure, a configuration in which the first optical axis O1, the first direction D1, and/or the second direction D2 intersect substantially perpendicular to each other may be included.

According to various embodiments of the disclosure, the second driving unit 204b generates, for example, a driving force for moving the second guide member 203b in the first direction D1, in which the second magnet 243b may be disposed on the barrel structure 202 (e.g., the barrel base 202a). In an embodiment of the disclosure, the barrel structure 202 may be constrained to the second guide member 203b in the first direction D1 by the second rail structure or the third guide ball(s) 295. For example, the driving force generated by the second driving unit 204b may move the second guide member 203b with the barrel structure 202 with respect to the first guide member 203a in the first direction D1. The second guide balls 293 may guide the second guide member 203b to smoothly move in the first direction D1 by providing a predetermined gap between the first guide member 203a and the second guide member 203b.

According to various embodiments of the disclosure, the second coil 241b and the second magnet 243b may be disposed to substantially face each other in the first direction D1 intersecting the first optical axis O1. In some embodiments of the disclosure, when viewed from the second coil 241b, the second magnet 243b may be a unipolar magnet having either an N pole or an S pole. For example, when an electric signal is applied to the second coil 241b, an attractive or repulsive force is generated between the second coil 241b and the second magnet 243b, thereby moving the barrel structure 202 or the second guide member 203b with respect to the first guide member 203a in the first direction D1. In another embodiment of the disclosure, the third coil 241c and the third magnet 243c may be disposed to substantially face each other in the second direction D2 intersecting the first direction D1 while intersecting the first optical axis O1. In some embodiments of the disclosure, when viewed from the third coil 241c, the third magnet 243c may be a unipolar magnet having either an N pole or an S pole. For example, as in a solenoid-type voice coil motor, when an electric signal is applied to the third coil 241c, an attractive or repulsive force is generated between the third coil 241c and the third magnet 243c, thereby moving the barrel structure 202 with respect to the second guide member 203b in the second direction D2.

In various embodiments of the disclosure, within the camera housing 201, the second magnet 243b or the third magnet 243c may be disposed between the second coil 241b and the reflective member 205 or between the third coil 241c and the members 205. For example, the barrel base 202a may provide a surface facing at least one of the coils 241a, 241b, and 241c in the camera housing 201, and at least one of the magnets 243a, 243b, and 243c may be disposed to face one of the coils 241a, 241b, and 241c while being disposed on the barrel base 202a. In the illustrated embodiment of the disclosure, it is noted that the configuration in which the first coil 241a and the first magnet 243a are disposed to substantially face each other in the second direction D2 is exemplified, but various embodiments of the disclosure are not limited thereto. For example, the first driving unit 204a generates a driving force for moving the guide unit 203 and/or the barrel structure 202 in the first optical axis O1 direction, in which the arrangement directions of the first coil 241a and the first magnet 243a may be variously implemented depending on whether the first driving unit has a structure in which a share force is generated as in a Lorentz-type voice coil motor or a structure in which an attractive force (or repulsive force) is generated as in a solenoid-type voice coil motor.

According to various embodiments of the disclosure, the camera module 200 may include one or more yokes 245a, 245b, and/or 245c. The yoke(s) 245a, 245b, and/or 245c may, for example, align an electric and/or magnetic field generated in the driving unit 204 within a predetermined area or space. For example, the yoke(s) 245a, 245b, and/or 245c cause the electric field and/or magnetic field generated in the driving unit 204 to act within a predetermined area or space, thereby contributing to reducing power applied to the coil(s) 241a, 241b, and/or 241c or miniaturizing the driving unit 204. According to an embodiment of the disclosure, by reducing power consumption or miniaturizing the driving unit 204, the camera module 200 may be easily mounted in a miniaturized electronic device and may enhance power efficiency in a focus adjustment or optical image stabilization operation.

According to various embodiments of the disclosure, a first yoke 245a disposed on the first driving unit 204a may be disposed on the camera housing 201 (e.g., the base member 201a) and may generate an attractive force with the first magnet 243a. For example, a force for bringing the first guide member 203a into close contact with the inner surface of the camera housing 201 may be generated by the first yoke 245a and the first magnet 243a, and the first guide ball(s) 291 may be stably accommodated in the rail structure between the camera housing 201 and the first guide member 203a while smoothening the movement of the first guide member 203a with respect to the camera housing 201. Similar to the arrangement of the first yoke 245a, the second driving unit 204b or the third driving unit 204c may be provided with a second yoke 245b or a third yoke 245c.

In another embodiment of the disclosure, an additional yoke (not illustrated) may be disposed on the bottom surface of the base member 201a, and the additional yoke may generate an attractive force with the second magnet 243b or the third magnet 243c to stabilize the arrangement of the second guide ball(s) 293 or the third guide ball(s) 295. In some embodiments of the disclosure, the additional yoke may be a portion of the base member 201a or may be disposed as a separate structure that is capable of generating an attractive force between the bottom surface of the base member 201a and the barrel structure 202 in the first optical axis O1 direction.

According to various embodiments of the disclosure, the camera module 200 may further include a flexible printed circuit board 249 and/or driving chip(s). The flexible printed circuit board 249 includes wiring lines that provide a driving force for applying an electric signal to the driving unit 204 (e.g., the coils 241a, 241b, and 241c), and may be disposed to at least partially wrap the side walls 213 (e.g., the second side wall 213b, the third side wall 213c, and/or the fourth side wall 213d) of the base member 201a. For example, the above-described coils 241a, 241b, and 241c may be disposed on one surface of the flexible printed circuit board 249, and may receive an electrical signal or a control signal via the flexible printed circuit board 249. In an embodiment of the disclosure, when at least one of the yokes 245a, 245b, and 245c or the cover member 201b is coupled to the base member 201a, the flexible printed circuit board 249 may be fixed in the state of being in close contact with the base member 201a (e.g., the second side wall 213b, the third side wall 213c, and/or the fourth side wall 213d).

According to various embodiments of the disclosure, although not being assigned with reference numerals, the driving chip(s) may be disposed in an area surrounded by one of the coils 241a, 241b, and 241c on one surface of the flexible printed circuit board 249, and may be controlled by a processor (e.g., the processor 120 in FIG. 1) to apply a control signal to one of the coils 241a, 241b, and 241c. In some embodiments of the disclosure, at least one of the driving chip(s) may include a sensor configured to detect the position of the barrel structure 202, or a sensor separate from the driving chip(s) may be provided in the camera module 200. Such a sensor may include, for example, at least one Hall sensor, and may detect a position or a change in the position of the barrel structure 202. The processor (e.g., the processor 120 in FIG. 1) may detect an external force (e.g., vibration) applied to the camera module 200 or the electronic device by using a gyro sensor, and may control driving chip(s) or coil(s) based on the current position of the barrel structure 202 or the change in the position of the barrel structure 202 by an external force, which is detected through the Hall sensor. In making the barrel structure 202 linearly reciprocate, the processor may apply an electrical signal to the first coil 241a to perform focus adjustment (or focal length adjustment), and may apply an electric signal to the second coil 241b or the third coil 241c to execute an optical image stabilization operation.

According to various embodiments of the disclosure, the reflective member 205 may include a prism or a mirror accommodated in the camera housing 201, and may be configured to refract or reflect light incident from the outside. For example, light incident from the outside along the first optical axis O1 direction may be refracted or reflected by the reflective member 205 and may proceed along the second optical axis O2 direction intersecting the first optical axis O1 to be incident on the image sensor 206. In an embodiment of the disclosure, the second optical axis O2 may be substantially perpendicular to one of the first direction D1 or the second direction D2, and may be substantially parallel to another one of the first direction D1 or the second direction D2.

According to various embodiments of the disclosure, the camera module 200 may further include a holder 259, and the reflective member 205 may be accommodated in the camera housing 201 in the state of being disposed in the holder 259. The holder 259 may be at least partially disposed inside the camera housing 201 through, for example, the bottom surface of the base member 201a, and in the state in which the reflective member 205 is disposed in the holder 259, one surface (e.g., the incident surface IS in FIG. 7) of the reflective member 205 may be aligned with the lens(es) 221 on the first optical axis O1, and the other surface (e.g., the exit surface ES in FIG. 7) may be aligned with the image sensor 206 on the second optical axis O2. The first optical axis O1 and the second optical axis O2 may intersect each other on the reflective surface (e.g., the reflective surface RS in FIG. 7) of the reflective member 205. In some embodiments of the disclosure, the first optical axis O1 and the second optical axis O2 may intersect each other substantially perpendicularly. However, various embodiments of the disclosure are not limited thereto, and the inclination angle of the optical axis O2 with respect to the first optical axis O1 may vary depending specifications or shapes required in the electronic device (e.g., the electronic device 101 in FIG. 1) or the camera module 200.

According to various embodiments of the disclosure, the image sensor 206 may be disposed on the camera housing 201 (e.g., the first side wall 213a among the side walls 213 of the base member 201a) and aligned with the reflective member 205 in the second optical axis (O2) direction. For example, the image sensor 206 may receive light refracted or reflected by the reflective member 205. In an embodiment of the disclosure, the lens 221 may guide or focus light incident from the outside on the reflective member 205, and the reflective member 205 refracts or reflects the light incident through the lens 221 to be guided or focused to the image sensor 206. In some embodiments of the disclosure, the image sensor 206 may be disposed to face the second coil 241b (or the second driving unit 204b) with at least a portion of the reflective member 205 interposed therebetween. For example, by being disposed in a space substantially surrounded by the side walls 213 of the base member 201a, the reflective member 205 may be disposed to overlap or face one of the image sensor 206 or the coils 241a, 241b, and the 241c (or the driving unit 204) in a direction intersecting the first optical axis O1.

According to various embodiments of the disclosure, light incident from the outside may be gradually focused on the image sensor 206 while passing through an optical component, such as the lens 221 or the reflective member 205. In an embodiment of the disclosure, when an optical component disposed closer to a subject or disposed farther from the image sensor 206 has a larger effective diameter, the camera module 200 may acquire a larger amount of light. For example, an optical component disposed closer to the image sensor 206 may have a smaller size. In some embodiments of the disclosure, the reflective member 205 may have a lower efficiency than the lens 221 in actually focusing the light while changing the traveling direction of the incident light. When the reflective member 205 is the first optical component disposed on the subject side, the size or volume of the reflective member 205 may be considerably large in order to ensure that the camera module 200 acquires a sufficient amount of light. For example, by disposing the reflective member 205 as the first optical component on the subject side, a folded optical system may be configured and the degree of freedom in design may be increased in the arrangement direction of the lenses, but it may be difficult to achieve miniaturization while ensuring stable optical performance (e.g., a sufficient amount of light). As the size or volume of the reflective member 205 increases, a larger driving mechanism or power may be required in an image stabilization operation implemented by driving the reflective member 205. In another embodiment of the disclosure, when the reflective member 205 is disposed between the arrangement of the lens(es) 221 and the image sensor 206, the reflective member 205 may increase the back focal length of the lens(es) 221 while having a small effect on the amount of light that may be substantially acquired by the camera module 200. For example, when the reflective member 205 is disposed between the arrangement of the lens(es) 221 and the image sensor 206, the reflective member 205 and/or the camera module 200 may be miniaturized, and the telephoto performance of the camera module 200 may be improved. For example, in implementing the folded optical system, by disposing the reflective member 205 between the arrangement of the lens(es) 221 and the image sensor 206, it may be easy to implement a telephoto lens having a magnification from ×3 to ×5 while miniaturizing the camera module 200.

According to various embodiments of the disclosure, in mounting the camera module 200 in a miniaturized electronic device and/or in providing an environment in which an entire focal length or focus adjustment (or a focal length adjustment) operation of the camera module 200 is capable of being executed, the barrel structure 202 (e.g., the barrel) may partially protrude to the outside of the camera housing 201. In this arrangement structure, when the driving unit 204 is disposed to overlap the barrel 202b in a direction intersecting the first optical axis O1, the driving unit 204 may partially protrude to the outside of the camera housing 201. This may cause deterioration of the appearance of the camera module 200 or the electronic device. According to various embodiments of the disclosure, by disposing the driving unit 204 to substantially overlap the reflective member 205 in a direction intersecting the first optical axis O1, it is possible to stably implement a focus adjustment or optical image stabilization operation while disposing the driving unit 204 in the state of being non-exposed to the outside of the camera housing 201.

Figure 5:
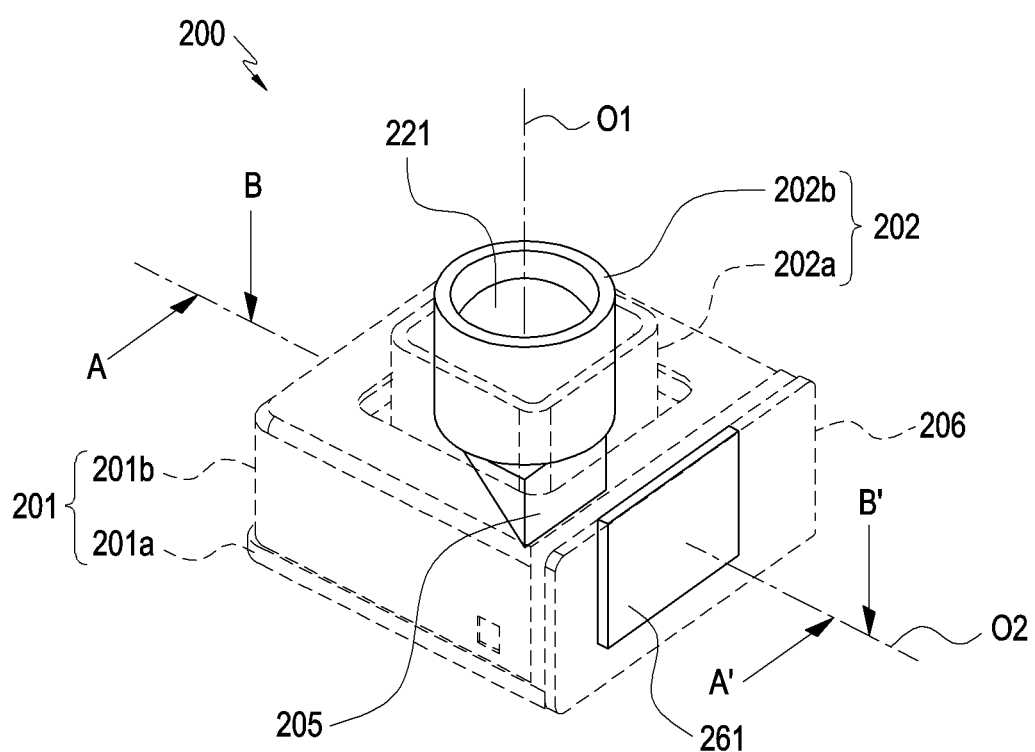
FIG. 5 is a view illustrating a structure in which lens(es) and/or a reflective member are disposed in a camera module according to an embodiment of the disclosure.

FIG. 5 is a view illustrating a structure in which lens(es) and/or a reflective member are disposed in a camera module according to an embodiment of the disclosure.

Figure 6:
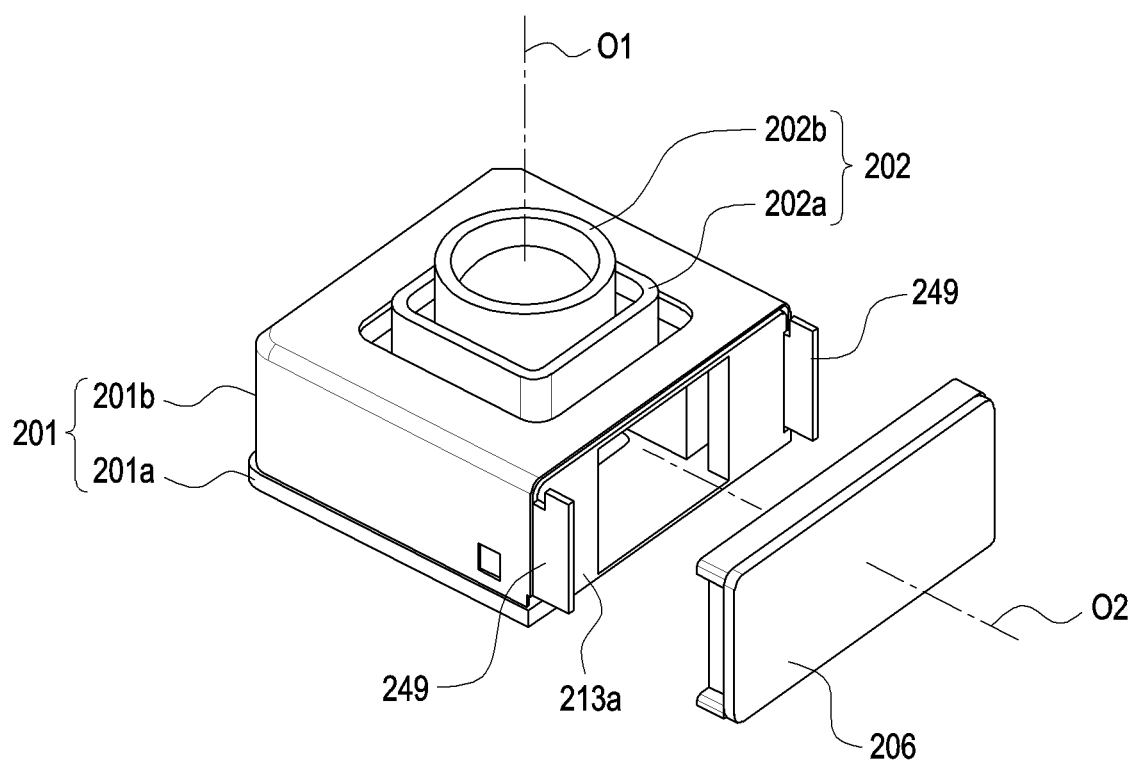
FIG. 6 is an exploded perspective view illustrating a camera module according to an embodiment of the disclosure.

FIG. 6 is a perspective view illustrating a camera module according to an embodiment of the disclosure.

Referring to FIGS. 5 and 6, the barrel 202b may be disposed to guide or focus light incident from the outside along the first optical axis O1 direction, and the reflective member 205 may be disposed inside the camera housing 201 in the state of being aligned with the barrel 202b (e.g., the lens 221) in the first optical axis O1 direction. The reflective member 205 may refract or reflect light incident through the lens 221 in the second optical axis O2 direction, and the image sensor 206 may be disposed on the first side wall 213a in the state of being aligned with the reflective member 205 in the second optical axis O2 direction. Accordingly, the camera module 200 may receive external light along the first optical axis O1 direction, and the light incident from the outside may be reflected by the reflective member 205 to be guided to the image sensor 206. For example, the lens(es) 221 are arranged along the first optical axis O1 direction to be aligned with the reflective member 205, and the image sensor 206 (e.g., a sensor element 261) may be disposed to face the reflective member 205 in the second optical axis O2 direction.

According to various embodiments of the disclosure, the flexible printed circuit board 249 is substantially concealed by the cover member 201b on the third side wall and the fourth side wall (e.g., the third side wall 213c and the fourth side wall 213d in FIG. 2 or 3), and the opposite ends of the flexible printed circuit board 249 may be exposed at edges of the first side wall 213a. For example, the opposite ends of the flexible printed circuit board 249 may be electrically connected to the image sensor 206. Although not illustrated, on the second side wall 213b, the flexible printed circuit board 249 may be at least partially concealed by the cover member 201b, and in some embodiments of the disclosure, a portion of the flexible printed circuit board 249 may be exposed to the outside of the cover member 201b.

Figure 7:
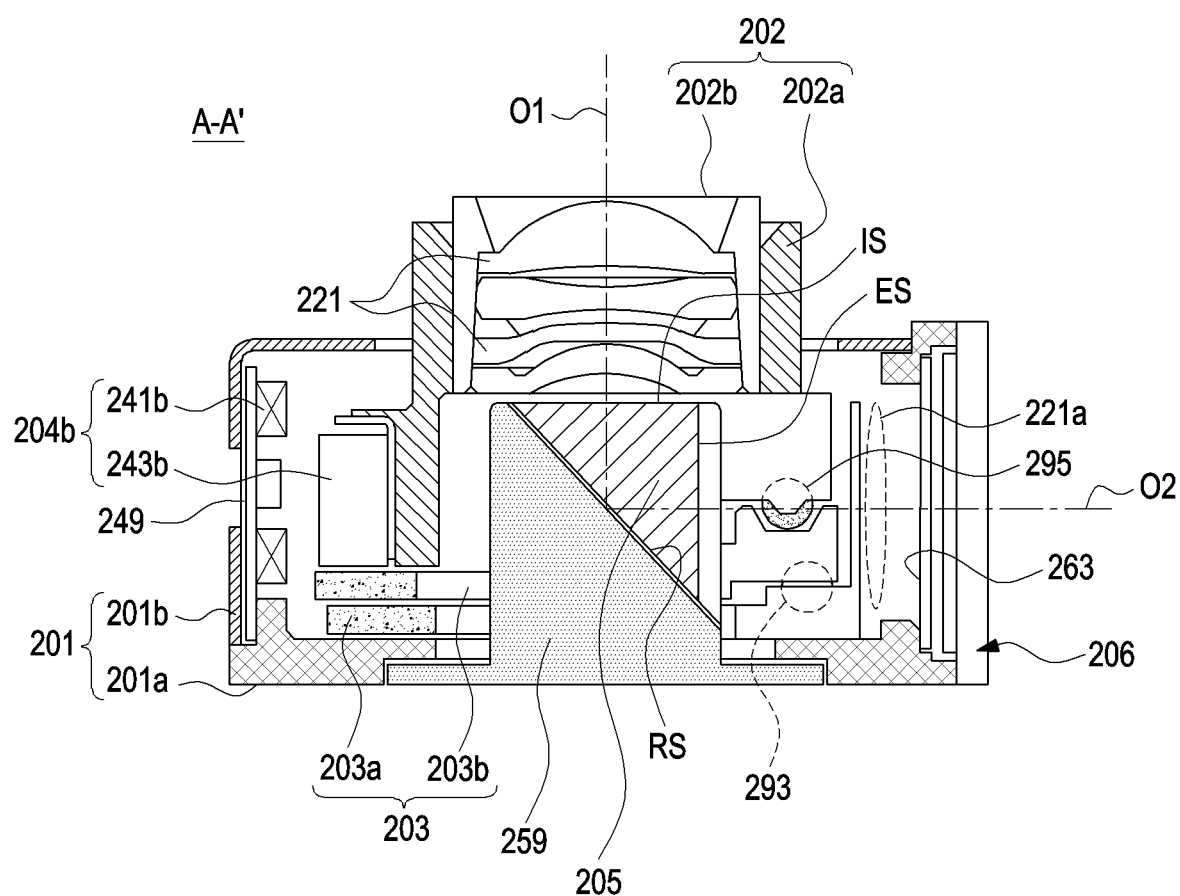
FIG. 7 is a first cross-sectional view illustrating a camera module cut along line A-A' in FIG. 5 according to an embodiment of the disclosure.

FIG. 7 is a first cross-sectional view illustrating a camera module cut along line A-A' in FIG. 5 according to an embodiment of the disclosure.

Figure 8:
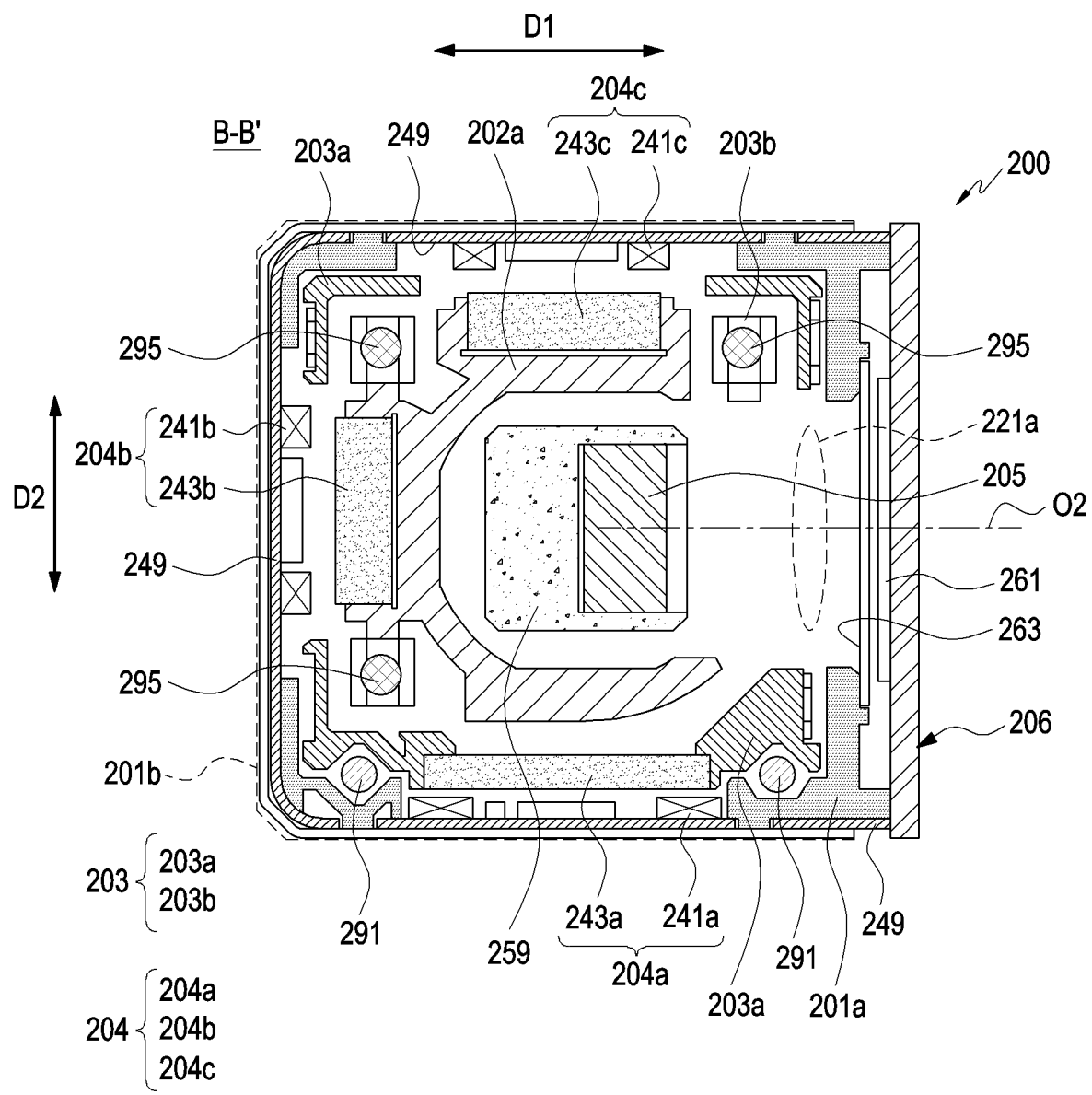
FIG. 8 is a second cross-sectional view illustrating a camera module cut along line B-B' in FIG. 5 according to an embodiment of the disclosure.

FIG. 8 is a second cross-sectional view illustrating a camera module 200 cut along line B-B' in FIG. 5 according to an embodiment of the disclosure.

Referring to FIGS. 7 and 8, the camera module 200 or the barrel structure 202 may include a plurality of lenses 221, and the number or specifications of lens(es) 221 may be variously combined according to the design conditions of the camera module 200. In an embodiment of the disclosure, the reflective member 205 may include an incident surface IS aligned with the lenses 221 in the first optical axis O1 direction, an exit surface aligned with the image sensor 206 in the second optical axis O2 direction, and a reflective surface RS configured to refract or reflect the light, which is incident in the first optical axis O1 direction, in the second optical axis O2 direction. In some embodiments of the disclosure, the camera module 200 may include an infrared cut filter 263 and/or an additional lens(es) 221a disposed between the reflective member 205 and the image sensor 206. The infrared cut filter 263 may be configured to block, for example, light in a wavelength band that is invisible to a naked eye but is detectable by the image sensor 206 (e.g., an infrared wavelength band). The additional lens(es) 221a may be selectively provided to satisfy optical design specifications required by the camera module 200.

According to various embodiments of the disclosure, the reflective member 205 may be at least partially disposed between the image sensor 206 and the second driving unit 204b and/or between the first driving unit 204a and the third driving unit 204c. The first coil 241a of the first driving unit 204a may be disposed on the camera housing 201 (e.g., the base member 201a), and the first magnet 243a of the first driving unit 204a may be disposed on the first guide member 203a or the barrel structure 202 (e.g., the barrel base 202a). As an electric signal is applied to the first driving unit 204a, the electric field of the first coil 241a and the magnetic field of the first magnet 243a interact to generate a driving force (e.g., a shearing force acting in the first optical axis O1 direction), and the first guide member 203a may move or reciprocate in the first optical axis O1 direction while being guided by the first guide ball(s) 291.

According to various embodiments of the disclosure, the second driving unit 204b may be disposed to face the image sensor 206 with at least a portion of the reflective member 205 interposed therebetween, and the second coil 241b and the second magnet 243b may be disposed to directly face each other in the first direction D1 or the second optical axis O2 direction. For example, the first direction D1 and the second optical axis O2 direction may be substantially parallel to each other. In an embodiment of the disclosure, as an electric signal is applied to the second coil 241b, the second coil 241b and the second magnet 243b may generate an attractive or repulsive force, and by a driving force (e.g., an attractive force or repulsive force) generated by the second coil 241b and the second magnet 243b, the second guide member 203b may move or reciprocate together with the barrel structure 202 in the first direction D1. The third driving unit 204c may be similar to the second driving unit 204b in a configuration for generating a driving force, and may be different from the second driving unit 204b in an arrangement or alignment direction. For example, the third coil 241c and the third magnet 243c may be disposed to face each other in the second direction D2 or a direction substantially perpendicular to the second optical axis O2, and according to the operation of the third driving unit 204c, the barrel structure 202 may move or reciprocate with respect to the second guide member 203b in the second direction D2.

Referring to FIGS. 14 to 17, the first optical axis O1 may be substantially parallel to the Z-axis direction defined in the description of the electronic devices 400 and 500 in FIGS. 14 to 17, and the second optical axis O2, the first direction D1, and/or the second direction D2 may be substantially parallel to the XY plane defined in the description of the electronic device. However, this alignment direction is exemplified based on the ease of designing, manufacturing, and/or assembling the electronic device 400 or 500 and the camera module 200, and it is noted that various embodiments of the disclosure are not limited by this description. For example, depending on the shape or appearance of an actual electronic device or the holding habit of a user who use the electronic device, the first optical axis O1 may be substantially parallel to the X-axis or the Y-axis, and the second optical axis O2, the first direction D1, and/or the second direction D2 may be substantially parallel to the YZ plane or the XZ plane. In another embodiment of the disclosure, the first optical axis O1 and the second optical axis O2 may be disposed to be inclined with respect to each other at a non-perpendicular angle, and depending on the relative positional relationship between the first optical axis O1 and the second optical axis O2, the shape of the reflective member 205 and the arrangement of the lens(es) 221 or the image sensor 206 may be variously changed. The relative arrangement of the first optical axis O1 and the second optical axis O2 with respect to each other may be selected to suit the actual size or shape of the electronic device or the camera module 200.

Figure 9:
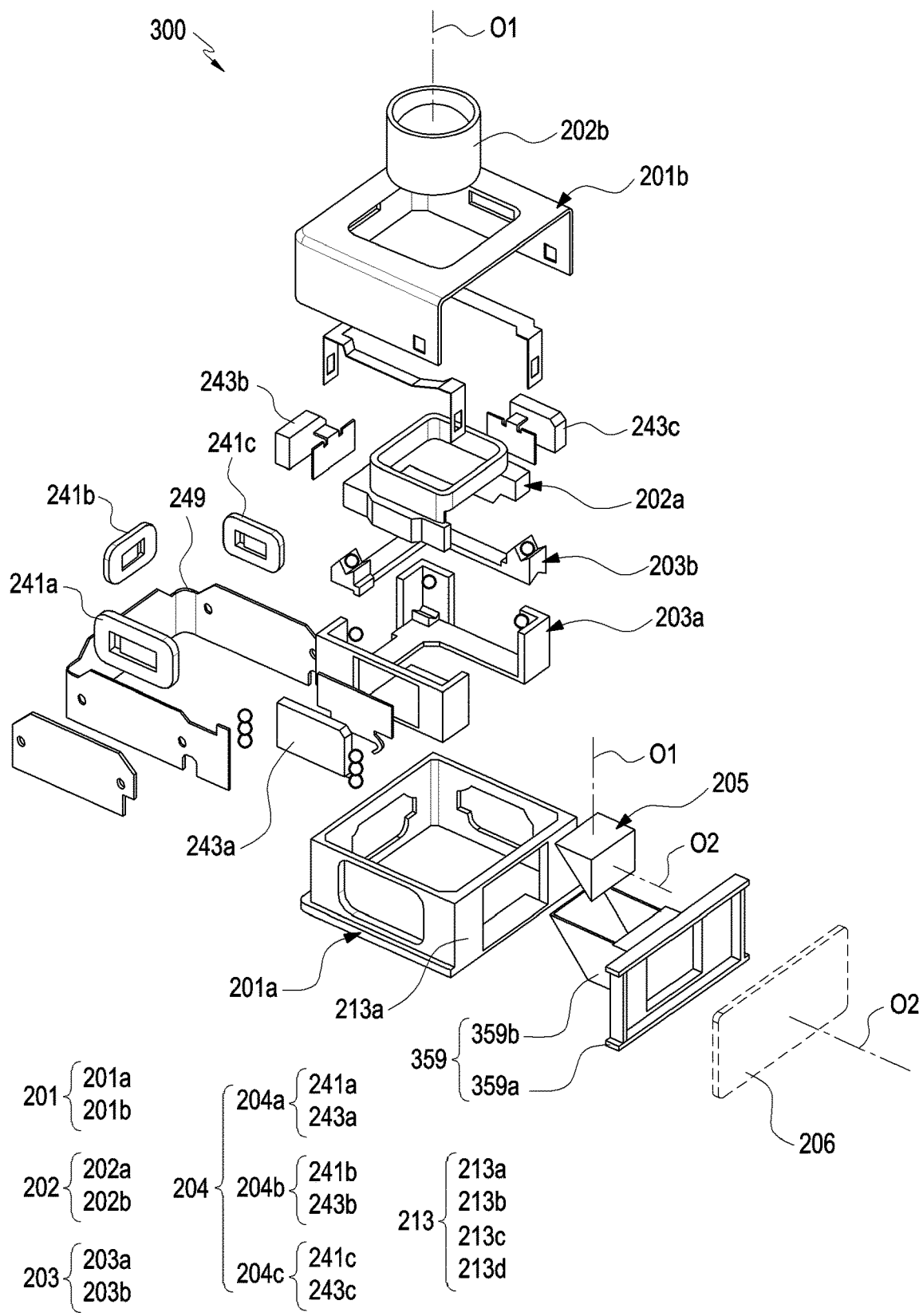
FIG. 9 is an exploded perspective view illustrating a camera module according to an embodiment of the disclosure.

FIG. 9 is an exploded perspective view illustrating a camera module according to an embodiment of the disclosure.

Figure 10:
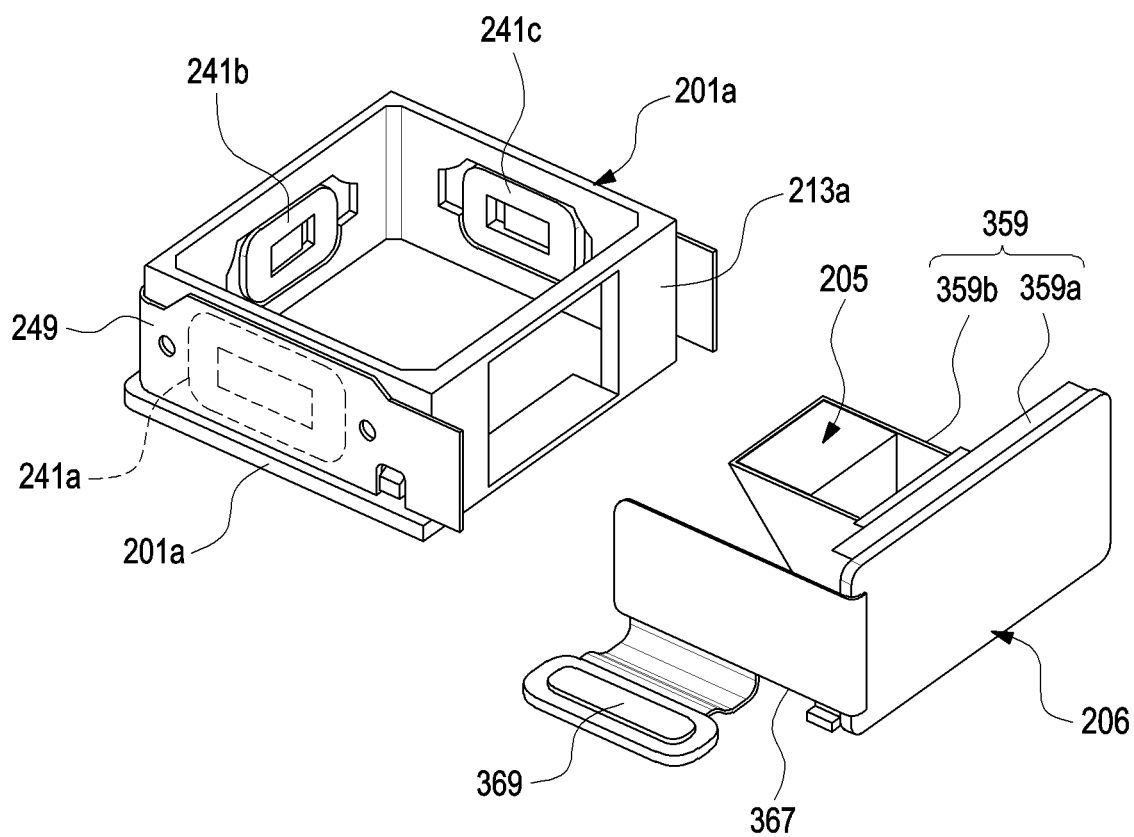
FIG. 10 is a view illustrating a structure in which a reflective member and/or an image sensor are disposed in a camera module according to an embodiment of the disclosure.

FIG. 10 is a view illustrating a structure a reflective member and/or an image sensor are disposed in a camera module according to an embodiment of the disclosure.

Figure 11:
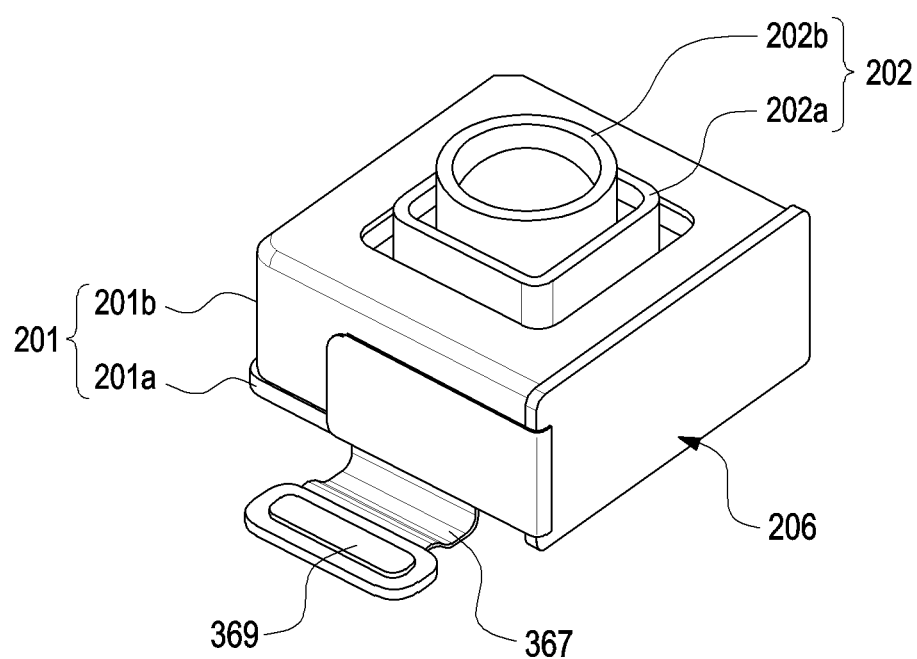
FIG. 11 is a perspective view illustrating a camera module according to an embodiment of the disclosure.

FIG. 11 is a perspective view illustrating a camera module according to an embodiment of the disclosure.

Figure 12:
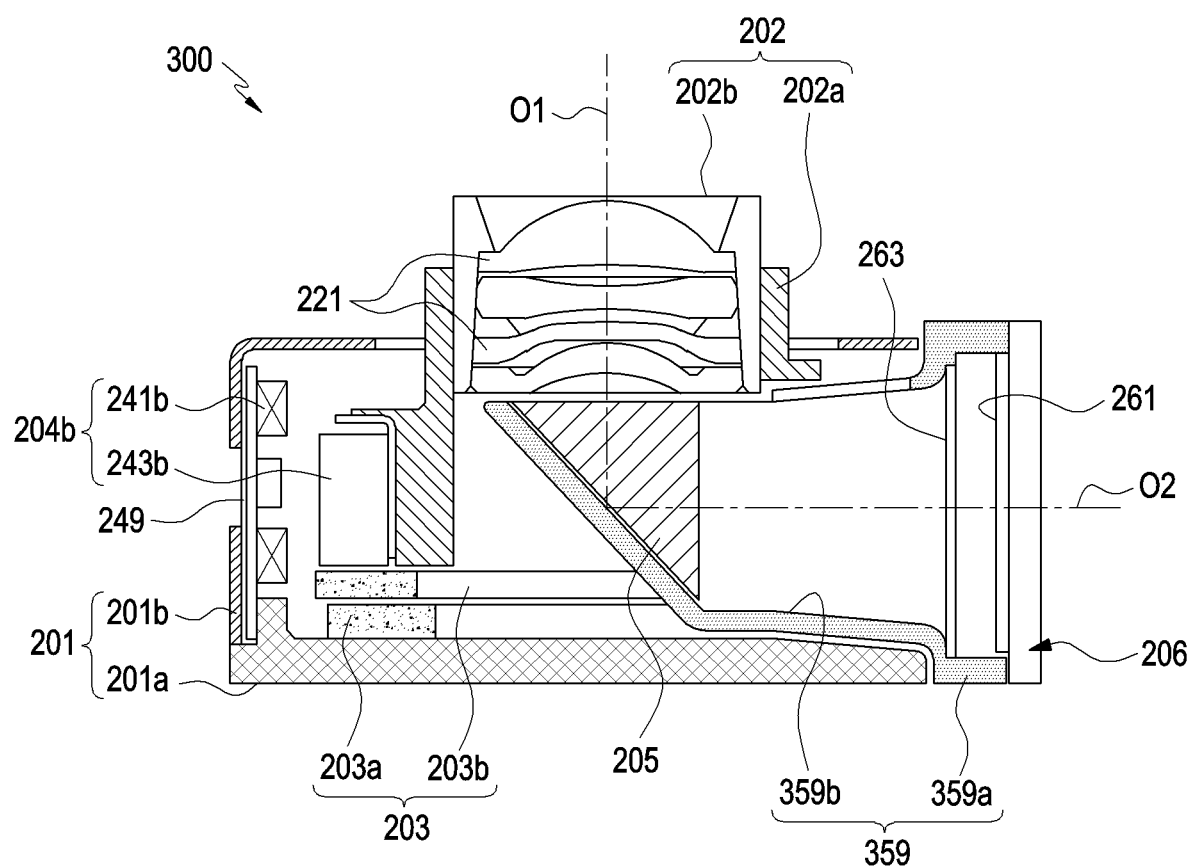
FIG. 12 is a first cross-sectional view obtained by cutting a camera module of FIG. 11 according to an embodiment of the disclosure.

FIG. 12 is a first cross-sectional view obtained by cutting a camera module of FIG. 11 according to an embodiment of the disclosure.

Figure 13:
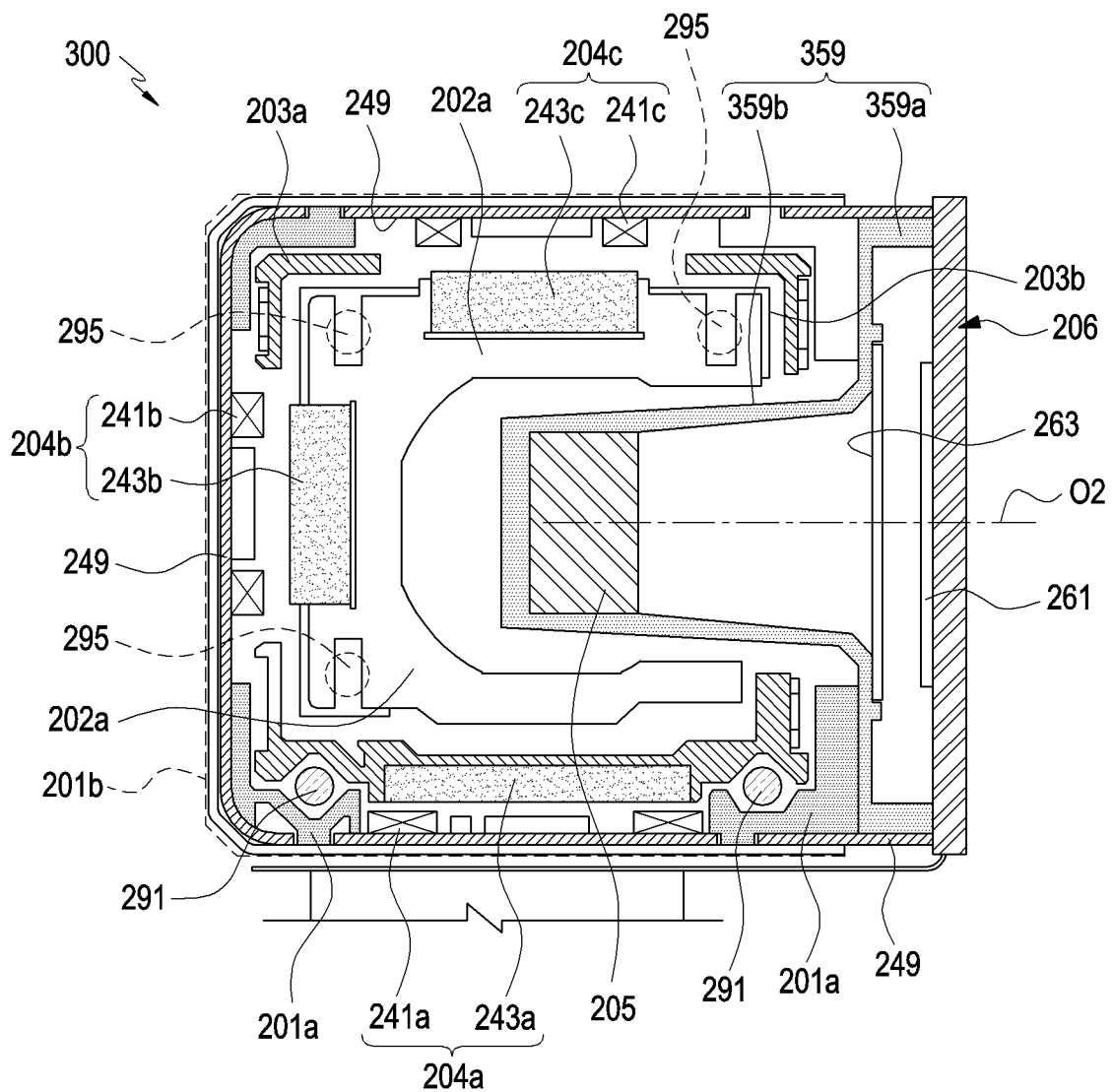
FIG. 13 is a second cross-sectional view obtained by cutting a camera module of FIG. 11 according to an embodiment of the disclosure.

FIG. 13 is a second cross-sectional view obtained by cutting a camera module in FIG. 11 according to an embodiment of the disclosure.

The camera module 300 illustrated in FIGS. 9 to 13 may be different from the camera module 200 illustrated in FIGS. 2 to 8 in the configuration of a holder 359 provided as the structure in which the reflective member 205 is disposed in the camera housing 201. In describing the embodiment of the disclosure, the components that may be easily understood through the preceding embodiments may be denoted by the same reference numerals or the reference numerals thereof may be omitted, and a detailed description thereof may also be omitted.

Referring to FIGS. 9 to 13, the camera module 300 may include a camera housing 201, a barrel structure 202, a guide unit 203, a driving unit 204, a reflective member 205 and/or an image sensor 206. The barrel structure 202 may receive a driving force from the driving unit 204 and may linearly reciprocate in the first optical axis O1 direction on the camera housing 201 or in at least two directions D1 and D2 intersecting the first optical axis O1. According to an embodiment of the disclosure, the guide unit 203 may move back and forth in the first optical axis O1 direction by the driving force of the driving unit 204, and may guide the barrel structure 202 on the camera housing 201 to reciprocate in at least two directions D1 and D2 intersecting the first optical axis O1.

According to various embodiments of the disclosure, the reflective member 205 may be disposed on the camera housing 201 together with the image sensor 206 by the holder 359. For example, the reflective member 205 may be disposed substantially inside the camera housing 201 by the holder 359 and may be aligned with the barrel structure 202 or the lens 221 in the first optical axis O1. In an embodiment of the disclosure, the reflective member 205 may be disposed to at least partially face the driving unit 204 or the image sensor 206 in a direction intersecting the first optical axis O1. For example, the reflective member 205 may be at least partially disposed between the second coil 241b of the drive units 204 and the image sensor 206 and/or the first coil 241a and the third coil 241c of the drive units 204. In another embodiment of the disclosure, the reflective member 205 may be at least partially disposed between the second magnet 243b of the drive units 204 and the image sensor 206 and/or the first magnet 243a and the third magnet 243c of the drive units 204.

According to various embodiments of the disclosure, the image sensor 206 may be disposed on the camera housing 201 together with the reflective member 205 by the holder 359. For example, the image sensor 206 may be disposed in the holder 359 substantially together with the reflective member 205, and the holder 359 may be coupled to penetrate the first side wall 213a of the camera housing 201 (e.g., the base member 201a). According to an embodiment of the disclosure, the holder 359 may include a first holder portion 359a having a flat plate shape disposed on the first side wall 213a, and a second holder portion 359b extending from the first holder portion 359a to be disposed inside the base member 201a. For example, the image sensor 206 may be disposed on the first holder portion 359a, and the reflective member 205 may be disposed on the second holder portion 359b. In some embodiments of the disclosure, the second holder portion 359b may provide a path or a space through which light at least partially refracted or reflected by the reflective member 205 travels.

According to various embodiments of the disclosure, the image sensor 206 may further include a second flexible printed circuit board 367 extending from one side. The second flexible printed circuit board 367 may include a connector 369 provided at one end, and may be electrically or mechanically coupled to a main circuit board (e.g., the printed circuit board 540 in FIG. 16) of the electronic device via the connector 369. In another embodiment of the disclosure, the second flexible printed circuit board 367 may provide wiring lines for transmitting power or control signals between the flexible printed circuit board 249 on which the coils 241a, 241b, and 241c are disposed and the main circuit board. In another embodiment of the disclosure, the second flexible printed circuit board 367 may be substantially a portion of the flexible printed circuit board 249.

In the following detailed description, a longitudinal direction, a width direction, and/or a thickness direction of an electronic device may be referred to, in which the longitudinal direction may be referred to as the "Y-axis direction," the width direction may be referred to as the "X-axis direction," and/or the thickness direction may be referred to as the "Z-axis direction." In some embodiments of the disclosure, "negative/positive (−/+)" may be referred to together with the Cartesian coordinate system illustrated in the drawings regarding the directions in which components are oriented. For example, the front surface of an electronic device or a housing may be referred to as a "surface facing the +Z direction," and the rear surface may be defined as a "surface facing the −Z direction." In some embodiments of the disclosure, a side surface of the electronic device or the housing may include an area facing the +X direction, an area facing the +Y direction, an area facing the −X direction, and/or an area facing the −Y direction. In another embodiment of the disclosure, the "X-axis direction" may include both the "−X direction" and the "+X direction." In some embodiments of the disclosure, the first optical axis, the second optical axis, the first direction, or the second direction of the above-described camera module may be described in connection with the Cartesian coordinate system of FIGS. 14 to 17. It is noted that these are exemplified based on the Cartesian coordinate system illustrated in the drawings for the sake of brevity of description and/or in order to help the understanding of various embodiments of the disclosure, and the description of these directions or components does not limit the various embodiments disclosed herein.

Figure 14:
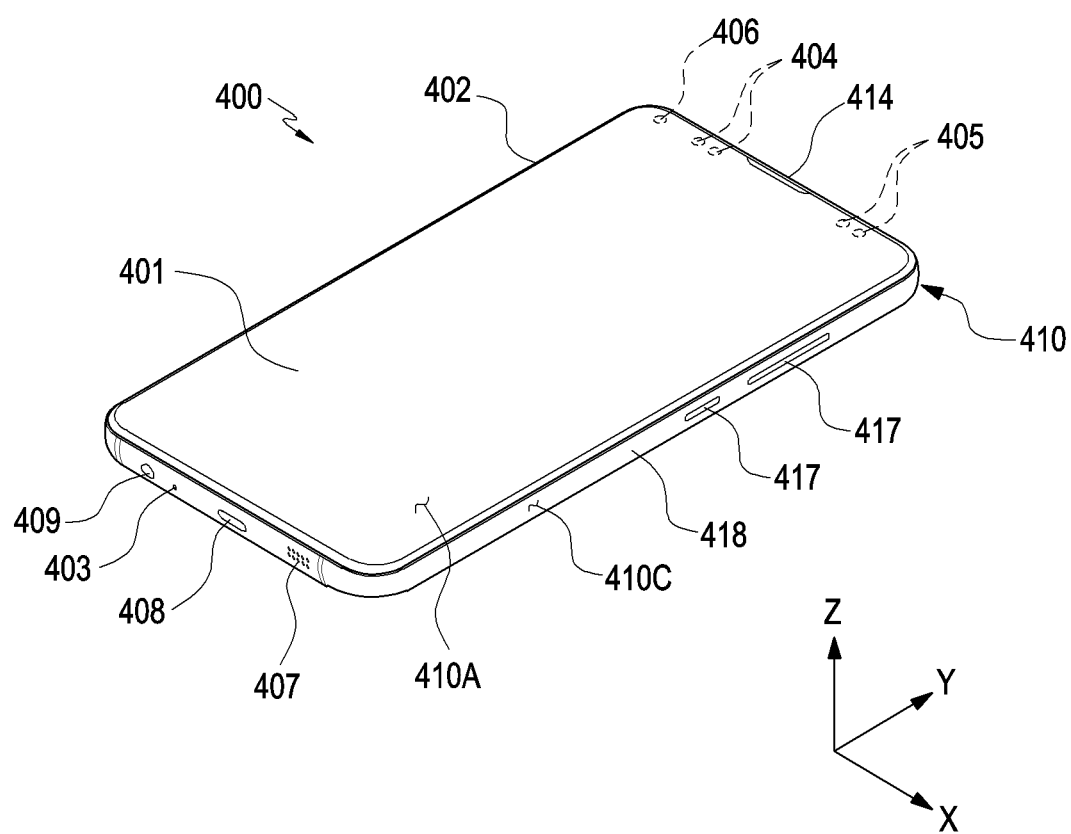
FIG. 14 is a perspective view illustrating a front surface of an electronic device that includes a camera module according to an embodiment of the disclosure.

FIG. 14 is a perspective view illustrating a front surface of an electronic device including camera modules according to an embodiment of the disclosure.

Figure 15:
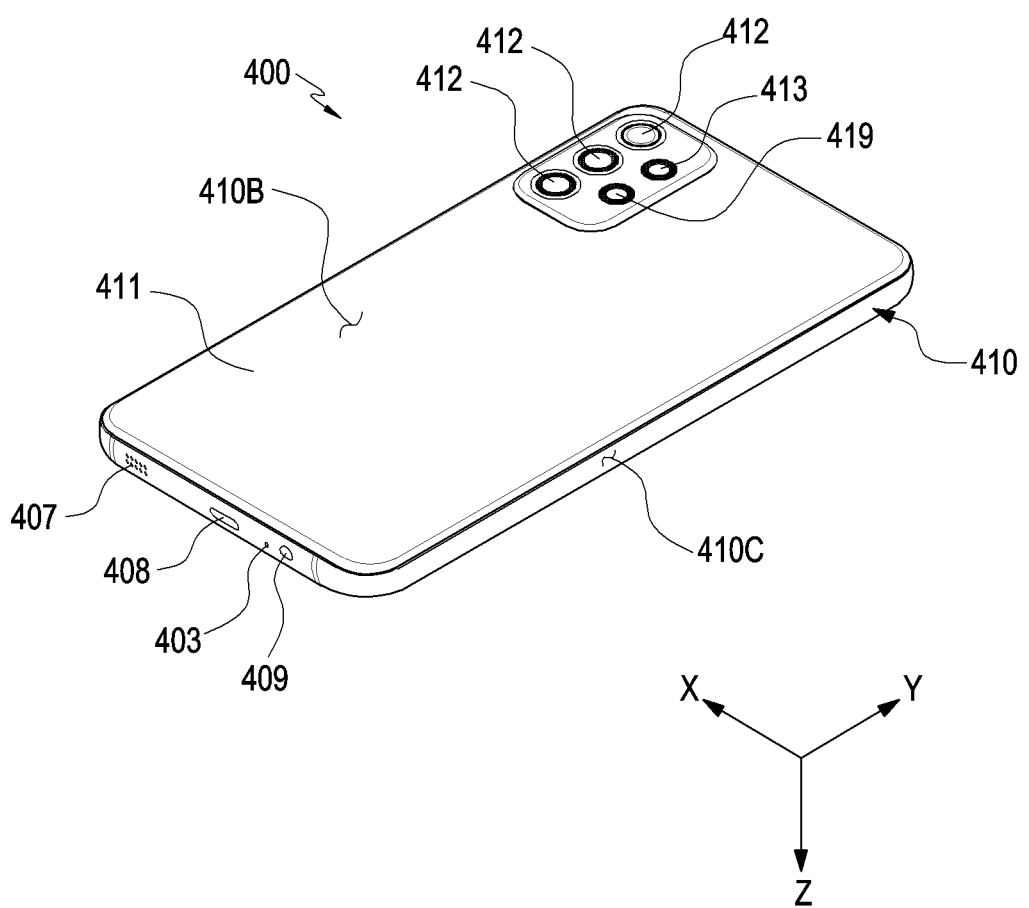
FIG. 15 is a perspective view illustrating a rear surface of an electronic device illustrated in FIG. 14 according to an embodiment of the disclosure.

FIG. 15 is a perspective view illustrating a rear surface of an electronic device illustrated in FIG. 14 according to an embodiment of the disclosure.

Referring to FIGS. 14 and 15, the electronic device 400 according to an embodiment may include a housing 410 including a first surface (or the front surface) 410A, a second surface (or the rear surface) 410B, and a side surface 410C surrounding the space between the first surface 410A and the second surface 410B. In another embodiment (not illustrated) of the disclosure, the housing 410 may refer to a structure that defines some of the first surface 410A of FIG. 14, the second surface 410B of FIG. 15, and the side surface 410C of FIG. 14. According to an embodiment of the disclosure, at least a portion of the first surface 410A may be configured with a substantially transparent front surface plate 402 (e.g., a glass plate or a polymer plate including various coating layers). The second surface 410B may be configured with a substantially opaque rear surface plate 411. The rear surface plate 411 may be made of, for example, coated or colored glass, ceramic, a polymer, a metal (e.g., aluminum, stainless steel (STS), or magnesium), or a combination of two or more of these materials. The side surface 410C may be configured with a side surface structure 418 coupled to the front surface plate 402 and the rear surface plate 411 and including a metal and/or a polymer. In some embodiments of the disclosure, the rear surface plate 411 and the side surface structure 418 are configured integrally with each other and may include the same material (e.g., a metal material, such as aluminum).

Although not illustrated, the front surface plate 402 may include area(s) that extend seamlessly from at least a portion(s) of an edge(s) toward the rear surface plate 411. In some embodiments of the disclosure, the front surface plate 402 (or the rear surface plate 411) may include only one of the areas, each of which is provided with the front surface plate 402 (or the rear surface plate 411) bent and extending toward the rear surface plate 411 (or the front surface plate 402), at one edge of the first surface 410A. According to an embodiment of the disclosure, the front surface plate 402 or the rear surface plate 411 may have a substantially flat plate shape, and in this case, may not include a bent and extending area. When the bent and extending area is included, the thickness of the electronic device 400 in the portion including the bent and extending area may be smaller than the thicknesses of other portions.

According to an embodiment of the disclosure, the electronic device 400 may include at least one of a display 401, audio modules 403, 407, and 414, sensor modules 404 and 419, camera modules 405, 412, and 413, key input devices 417, light-emitting elements 406, and connector holes 408 and 409. In some embodiments of the disclosure, in the electronic device 400, at least one of the components (e.g., the key input devices 417 or the light-emitting elements 406) may be omitted, or other components may be additionally included.

The display 401 may be exposed through a substantial portion of, for example, the front surface plate 402. In some embodiments of the disclosure, at least a portion of the display 401 may be exposed through the front surface plate 402 forming the first surface 410A or through a portion of the side surface 410C. In some embodiments of the disclosure, the edges of the display 401 may be configured to be substantially the same as the shape of the periphery of the front surface plate 402 adjacent thereto. In another embodiment (not illustrated), the distance between the periphery of the display 401 and the periphery of the front surface plate 402 may be substantially constant in order to increase the exposed area of the display 401.

In another embodiment (not illustrated), recesses or openings may be provided in a portion of the screen display area of the display 401, and one or more of the audio module 414, the sensor modules 404, the camera modules 405, and the light-emitting elements 406, which are aligned with the recesses or the openings, may be included. In another embodiment (not illustrated), the rear surface of the screen display area of the display 401 may include at least one of the audio module 414, the sensor modules 404, the camera modules 405, a fingerprint sensor (not illustrated), and the light-emitting elements 406. In another embodiment (not illustrated), the display 401 may be coupled to or disposed adjacent to a touch-sensitive circuit, a pressure sensor capable of measuring a touch intensity (pressure), and/or a digitizer configured to detect an electromagnetic field-type stylus pen. In some embodiments of the disclosure, when the front surface plate 402 (or the rear surface plate 411) includes an area bent and extending toward the rear surface plate 411 (or the front surface plate 402), at least some of the sensor modules 404 and 419, and/or at least some of the key input devices 417 may be disposed in the bent and extending area(s).

The audio modules 403, 407, and 414 may include a microphone hole 403 and speaker holes 407 and 414. The microphone hole 403 may include a microphone disposed therein to acquire external sound, and in some embodiments of the disclosure, a plurality of microphones may be disposed therein to be able to detect the direction of sound. The speaker hole 407 or 414 may include an external speaker hole 407 and a call receiver hole 414. In some embodiments of the disclosure, the speaker holes 407 and 414 and the microphone hole 403 may be implemented as a single hole, or a speaker may be included without the speaker holes 407 and 414 (e.g., a piezo speaker).

The sensor modules 404 and 419 may generate electrical signals or data values corresponding to the internal operating state or the external environmental state of the electronic device 400. The sensor modules 404 and 419 may include, for example, a first sensor module 410A (e.g., a proximity sensor) and/or a second sensor module (not illustrated) (e.g., a fingerprint sensor) disposed on the first surface 410A of the housing 410, and/or a third sensor module 419 and/or a fourth sensor module (e.g., a fingerprint sensor) disposed on the second surface 410B of the housing 410. The fingerprint sensor may be disposed not only on the first surface 410A (e.g., the display 401) of the housing 410, but also on the second surface 410B or the side surface 410C of the housing 410. The electronic device 400 may further include at least one of, for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 405, 412, and 413 may include a first camera device 405 (e.g., under display camera (UDC)) disposed on the first surface 410A of the electronic device 400, and a second camera device 412 and/or a flash 413 disposed on the second surface 410B of the electronic device 400. The camera devices 405 and 412 may include one or more lenses, an image sensor, and/or an image signal processor. The flash 413 may include, for example, a light-emitting diode or a xenon lamp. In some embodiments of the disclosure, four or more lenses (e.g., an infrared camera, a wide-angle lens, and a telephoto lens), and image sensors may be disposed on one surface of the electronic device 400. For example, at least one of the camera modules indicated by "412" in FIG. 15 may include the camera module 200 or 300 of FIGS. 2 to 13. In some embodiments of the disclosure, the flash 413 may emit infrared light, and the infrared light emitted by the flash 413 and reflected by a subject may be received through the third sensor module 419. The electronic device 400 or the processor of the electronic device 400 (e.g., the processor 120 in FIG. 1) may detect depth information of the subject based on a time point when infrared rays are received from the third sensor module 419.

The key input devices 417 may be disposed on the side surface 410C of the housing 410. In another embodiment of the disclosure, the electronic device 400 may not include some or all of the above-mentioned key input devices 417, and a key input device 417, which is not included in the electronic device 400, may be implemented in another form, such as a soft key, on the display 401. In some embodiments of the disclosure, a key input device may include a sensor module disposed on the second surface 410B of the housing 410.

The light-emitting elements 406 may be disposed, for example, on the first surface 410A of the housing 410. The light-emitting elements 406 may provide, for example, information about the state of the electronic device 400 in an optical form. In another embodiment of the disclosure, the light-emitting elements 406 may provide a light source that is interlocked with, for example, the operation of the camera module 405. The light-emitting elements 406 may include, for example, an LED, an IR LED, and a xenon lamp.

The connector holes 408 and 409 may include a first connector hole 408, which is capable of accommodating a connector (e.g., a USB connector) for transmitting/receiving power and/or data to/from an external electronic device, and/or a second connector hole 409, which is capable of accommodating a connector (e.g., an earphone jack) for transmitting/receiving an audio signal to/from an external electronic device.

Figure 16:
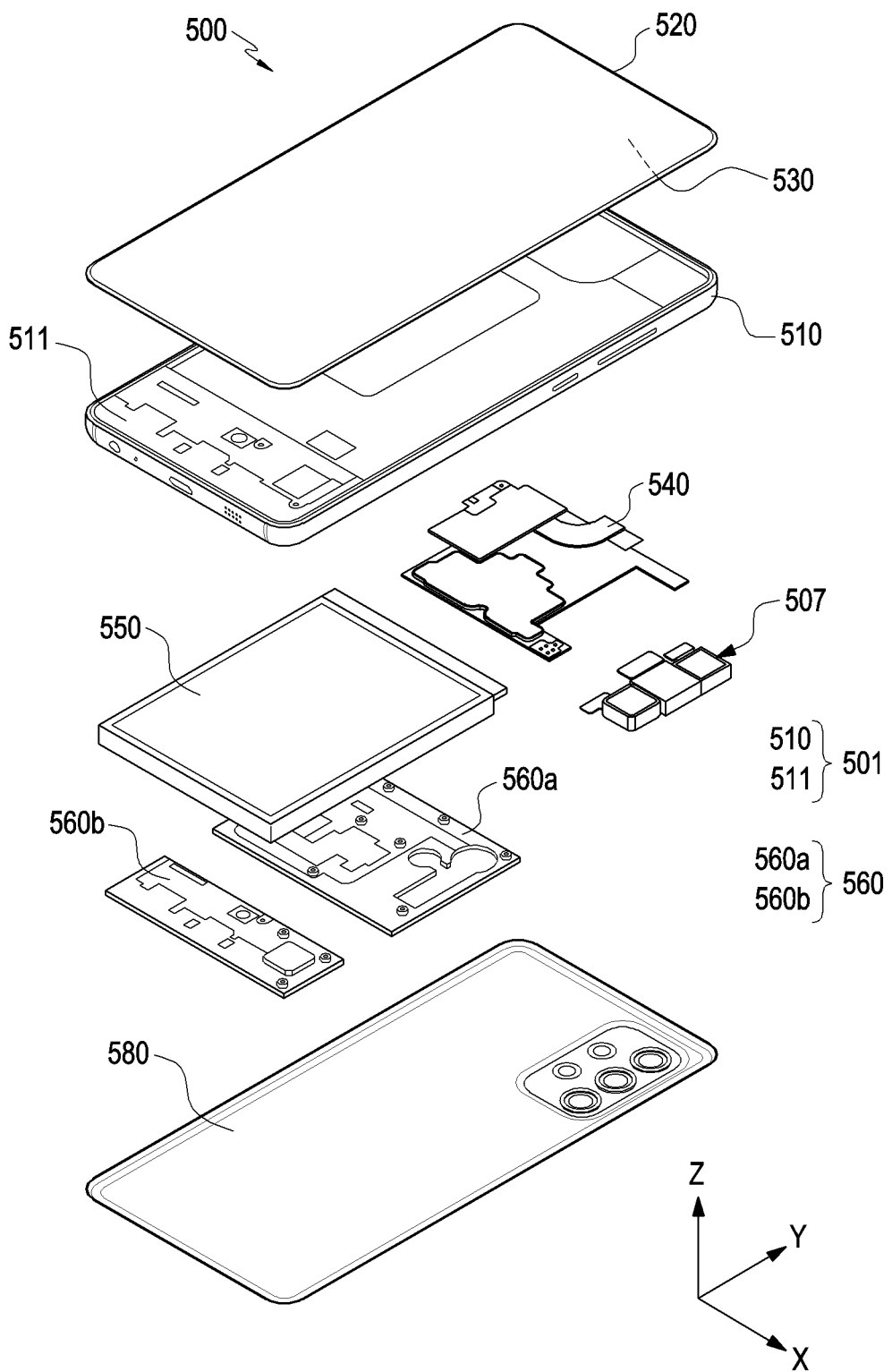
FIG. 16 is an exploded perspective view illustrating a front surface of an electronic device illustrated in FIG. 14 according to an embodiment of the disclosure.

FIG. 16 is an exploded perspective view illustrating a front surface of an electronic device illustrated in FIG. 14 according to an embodiment of the disclosure.

Figure 17:
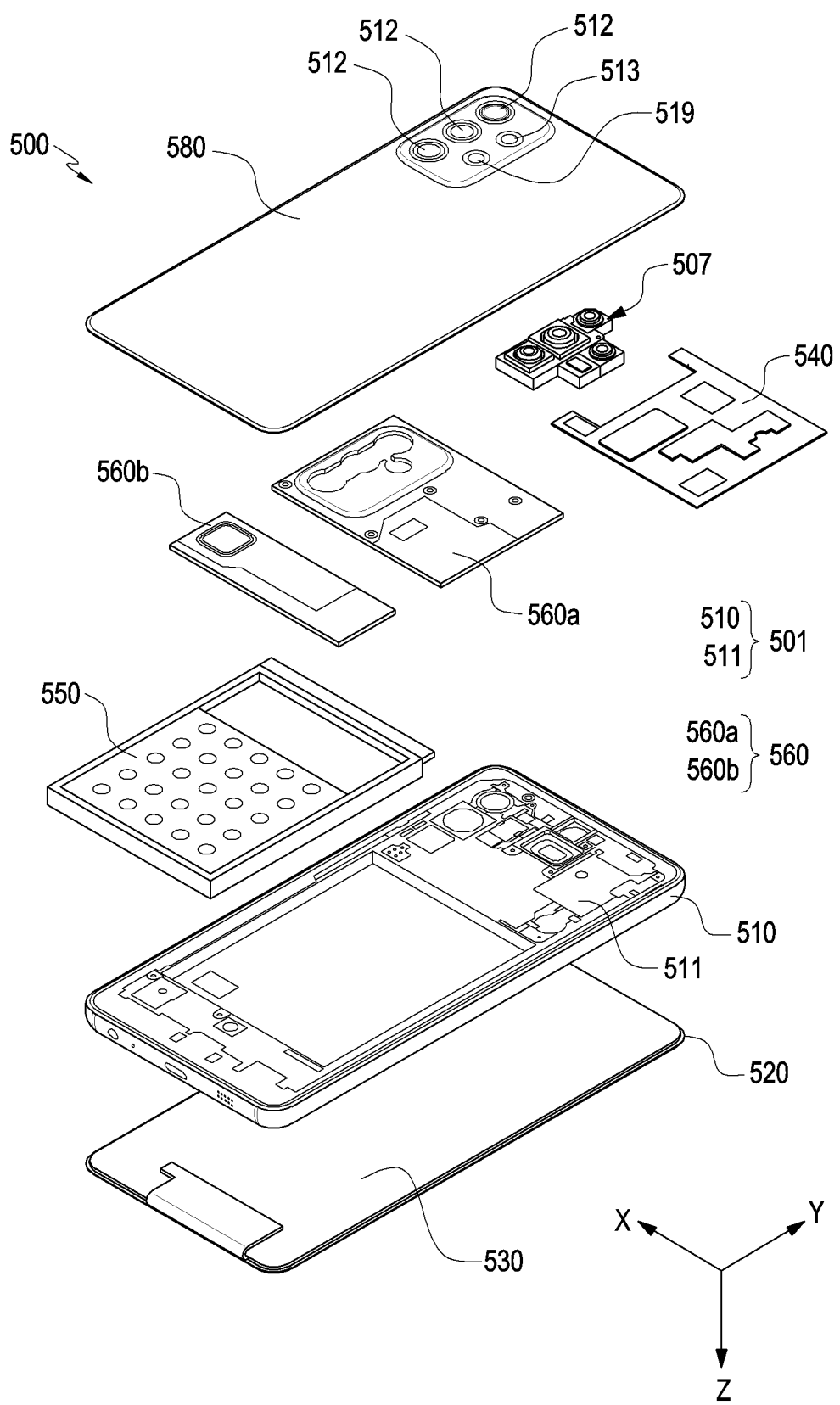
FIG. 17 is an exploded perspective view illustrating a rear surface of an electronic device illustrated in FIG. 14 according to an embodiment of the disclosure.

FIG. 17 is an exploded perspective view illustrating rear surface of an electronic device illustrated in FIG. 14 according to an embodiment of the disclosure.

Referring to FIGS. 16 and 17, the electronic device 500 (e.g., the electronic device 101 or 400 in FIG. 1, 14, or 15) may include a side surface structure 510, a first support member 511 (e.g., a bracket), a front surface plate 520 (e.g., the front surface plate 402 in FIG. 14), a display 530 (e.g., the display 401 in FIG. 14), a printed circuit board (or a substrate assembly) 540, a battery 550, a second support member 560 (e.g., a rear case), an antenna, a camera assembly 507, and a rear surface plate 580 (e.g., the rear surface plate 411 in FIG. 15). In some embodiments of the disclosure, in the electronic device 500, at least one of the components (e.g., the first support member 511 or the second support member 560) may be omitted, or other components may be additionally included. At least one of the components of the electronic device 500 may be the same as or similar to at least one of the components of the electronic device 400 of FIG. 14 or 15, and a redundant description thereof will be omitted below.

The first support member 511 may be disposed inside the electronic device 500, and may be connected to the side surface structure 510 or may be configured integrally with the side surface structure 510. The first support member 511 may be made of, for example, a metal material and/or a non-metal (e.g., polymer) material. At least a portion of the side surface structure 510 or the first support member 511 may serve as an antenna when the portion at least partially includes a metal material). The display 530 may be coupled to one surface of the first support member 511, and the printed circuit board 540 may be coupled to the other surface of the first support member 311. A processor (e.g., the processor 120 in FIG. 1), a memory (e.g., the memory 134 in FIG. 1), and/or an interface (e.g., the interface 177 in FIG. 1) may be mounted on the printed circuit board 540. The processor may include at least one of, for example, a central processing unit, an application processor, a graphics processing unit, an image signal processor, a sensor hub processor, or a communication processor.

According to various embodiments of the disclosure, the first support member 511 and the side surface structure 510 may be combined to be referred to as a front case or a housing 501. According to an embodiment of the disclosure, the housing 501 may be generally understood as a structure for accommodating, protecting, or disposing a printed circuit board 540 or a battery 550. In another embodiment of the disclosure, it may be understood that the housing 501 includes a structure that a user may visually or tactfully recognize from the appearance of the electronic device 500, such as the side surface structure 510, the front surface plate 520, and/or the rear surface plate 580. In another embodiment of the disclosure, the "front surface or rear surface of the housing 501" may be understood as the first surface 410A in FIG. 14 or the second surface 410B in FIG. 15. In some embodiments of the disclosure, the first support member 511 may be disposed between the front surface plate 520 (e.g., the first surface 410A in FIG. 14) and the rear surface plate 580 (e.g., the second surface 410B in FIG. 15), and may serve as a structure on which electrical/electronic components, such as a printed circuit board 540 or a camera assembly 507, may be disposed.

The memory may include, for example, a volatile memory or a non-volatile memory.

The interface may include, for example, a high-definition multimedia interface (HDMI), a universal serial bus (USB) interface, an SD card interface, and/or an audio interface. The interface may electrically or physically connect, for example, the electronic device 500 to an external electronic device, and may include a USB connector, an SD card/a multimedia card (MMC) connector, or an audio connector.

The second support member 560 may include, for example, an upper support member 560a and a lower support member 560b. In an embodiment of the disclosure, the upper support member 560a may be disposed to surround the printed circuit board 540 together with a portion of the first support member 511. A circuit device (e.g., a processor, a communication module, or a memory) implemented in the form of an integrated circuit chip or various electrical/electronic components may be disposed on the printed circuit board 540, and in some embodiments of the disclosure, the printed circuit board 540 may be provided with an electromagnetic shield environment from the upper support member 560a. In another embodiment of the disclosure, the lower support member 560b may be used as a structure on which electrical/electronic components, such as a speaker module and an interface (e.g., a USB connector, an SD card/MMC connector, or an audio connector) may be disposed. In some embodiments of the disclosure, electrical/electronic components, such as a speaker module and an interface (e.g., a USB connector, an SD card/MMC connector, or an audio connector) may be disposed on an additional printed circuit board (not illustrated). In this case, the lower support member 560b may be disposed to wrap the additional printed circuit board together with the other portion of the first support member 511. An additional printed circuit board (not illustrated), or a speaker module or an interface disposed on the lower support member 560b may be disposed corresponding to the audio module 407 or the connector holes 408 and 409 of FIG. 14.

The battery 550 is a device for supplying power to at least one component of the electronic device 500 and may include, for example, a non-rechargeable primary battery, a rechargeable secondary battery, or a fuel cell. At least a portion of the battery 550 may be disposed on substantially the same plane as, for example, the printed circuit board 540. The battery 550 may be integrally disposed inside the electronic device 500, or may be detachably disposed on the electronic device 500.

Although not illustrated, the antenna may include a conductor pattern implemented on the surface of the second support member 560 through, for example, a laser direct structuring method. In some embodiment of the disclosure, the antenna may include a printed circuit pattern provided on the surface of a thin film, and the thin film-type antenna may be disposed between the rear surface plate 580 and the battery 550. The antenna may include, for example, a near field communication (NFC) antenna, a wireless charging antenna, and/or a magnetic secure transmission (MST) antenna. The antenna may perform short-range communication with, for example, an external device, or may transmit/receive power required for charging to/from an external device in a wireless manner. In another embodiment of the disclosure, another antenna structure may be provided by a portion of the side surface structure 510 and/or the first support member 511, or a combination thereof.

The camera assembly 507 may include at least one camera module, for example, at least one of the camera modules 180, 200, 300, 405, and 412 of FIGS. 1 to 15. Inside the electronic device 500, the camera assembly 507 may receive at least some of light incident through optical holes or camera windows 512, 513, and 519. In some embodiments of the disclosure, the camera assembly 507 may be disposed on the first support member 511 at a position adjacent the printed circuit board 540. In an embodiment of the disclosure, the camera module(s) of the camera assembly 507 may be generally aligned with one of the camera windows 512, 513, and 519 and may be at least partially wrapped by a second support member 560 (e.g., the upper support member 560a).

According to various embodiments of the disclosure, the camera assembly 507 may include one of the camera modules 200 and 300 of FIGS. 2 to 13, and a camera module, which is one of the camera modules 200 and 300 of FIGS. 2 to 13 and is disposed in the camera assembly 507, may have higher telephoto performance than other camera modules of the camera assembly 507. A camera module, which is one of the camera modules 200 and 300 of FIGS. 2 to 13 and is disposed in the camera assembly 507, may have a first optical axis substantially parallel to the Z-axis direction, and "a plane intersecting the first optical axis" described with reference to FIGS. 2 to 13 may be substantially parallel to the XY plane. However, various embodiments of the disclosure are not limited thereto, and the Cartesian coordinate system of FIGS. 14 to 17 and the relative positions and inclinations of the first optical axis, the second optical axis, the first direction, and/or the second direction of FIGS. 2 to 13 may be designed in various ways.

Figure 18:
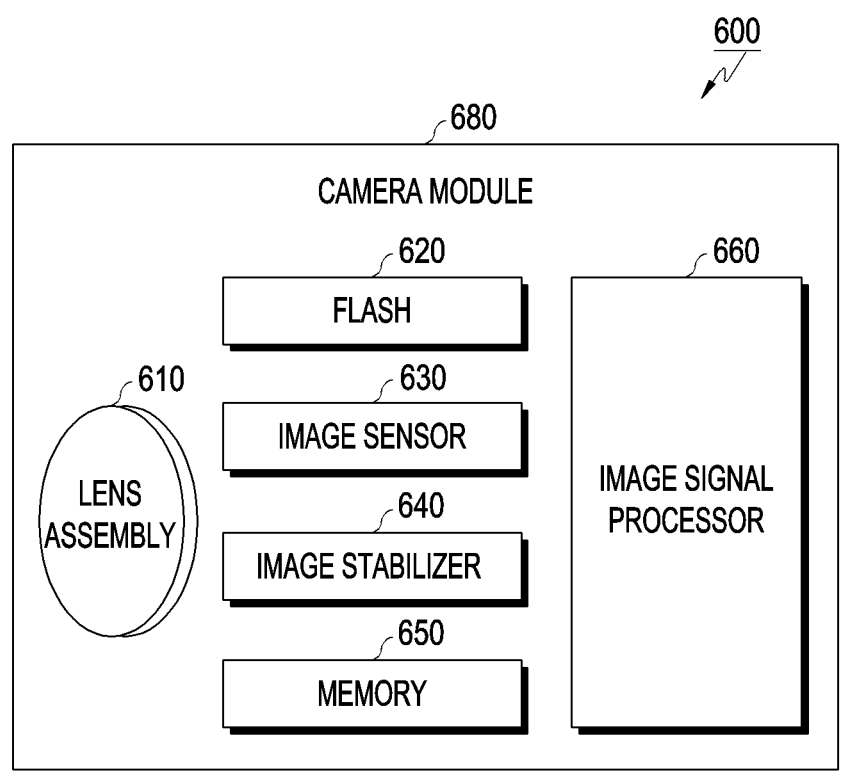
FIG. 18 is a block diagram illustrating a camera module according to an embodiment of the disclosure.

FIG. 18 is a block diagram 600 illustrating a camera module according to an embodiment of the disclosure.

Referring to FIG. 18, a camera module 680 may include a lens assembly 610, a flash 620, an image sensor 630, an image stabilizer 640, memory 650 (e.g., buffer memory), or an image signal processor 660. In an embodiment of the disclosure, the lens assembly 610 may include the image sensor 630. The lens assembly 610 may collect light emitted or reflected from an object whose image is to be taken. The lens assembly 610 may include one or more lenses. According to an embodiment of the disclosure, the camera module 680 may include a plurality of lens assemblies 610. In such a case, the camera module 680 may form, for example, a dual camera, a 360-degree camera, or a spherical camera. Some of the plurality of lens assemblies 610 may have the same lens attribute (e.g., view angle, focal length, auto-focusing, F-number, or optical zoom), or at least one lens assembly may have one or more lens attributes different from those of another lens assembly. The lens assembly 610 may include, for example, a wide-angle lens or a telephoto lens.

The flash 620 may emit light that is used to reinforce light reflected from an object. According to an embodiment of the disclosure, the flash 620 may include one or more light emitting diodes (LEDs) (e.g., a red-green-blue (RGB) LED, a white LED, an infrared (IR) LED, or an ultraviolet (UV) LED) or a xenon lamp. The image sensor 630 may obtain an image corresponding to an object by converting light emitted or reflected from the object and transmitted via the lens assembly 610 into an electrical signal. According to an embodiment of the disclosure, the image sensor 630 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 630 may be implemented using, for example, a charged coupled device (CCD) sensor or a complementary metal oxide semiconductor (CMOS) sensor.

The image stabilizer 640 may move the image sensor 630 or at least one lens included in the lens assembly 610 in a particular direction, or control an operational attribute (e.g., adjust the read-out timing) of the image sensor 630 in response to the movement of the camera module 680 or the electronic device 601 including the camera module 680. This allows compensating for at least part of a negative effect (e.g., image blurring) by the movement on an image being captured. According to an embodiment, the image stabilizer 640 may detect such a movement by the camera module 680 or the electronic device (e.g., the electronic device 101 of FIG. 1) using a gyro sensor (not shown) or an acceleration sensor (not shown) disposed inside or outside the camera module 680. According to an embodiment, the image stabilizer 640 may be implemented, for example, as an optical image stabilizer. The memory 650 may store, at least temporarily, at least part of an image obtained via the image sensor 630 for a subsequent image processing task. For example, if image capturing is delayed due to shutter lag or multiple images are quickly captured, a raw image obtained (e.g., a Bayer-patterned image, a high-resolution image) may be stored in the memory 650, and its corresponding copy image (e.g., a low-resolution image) may be previewed via the display module 160 of FIG. 1. Thereafter, if a specified condition is met (e.g., by a user's input or system command), at least part of the raw image stored in the memory 650 may be obtained and processed, for example, by the image signal processor 660. According to an embodiment, the memory 650 may be configured as at least part of a memory (e.g., the memory 130 of FIG. 1) or as a separate memory that is operated independently from the memory 130.

The image signal processor 660 may perform one or more image processing with respect to an image obtained via the image sensor 630 or an image stored in the memory 650. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 660 may perform control (e.g., exposure time control or read-out timing control) with respect to at least one (e.g., the image sensor 630) of the components included in the camera module 680. An image processed by the image signal processor 660 may be stored back in the memory 650 for further processing, or may be provided to an external component (e.g., the memory 130, the display module 160, the external electronic device 102, the external electronic device 104, or the server 108 of FIG. 1) outside the camera module 680. According to an embodiment, the image signal processor 660 may be configured as at least part of a processor (e.g., the processor 120 of FIG. 1), or as a separate processor that is operated independently from the processor 120. If the image signal processor 660 is configured as a separate processor from the processor 120, at least one image processed by the image signal processor 660 may be displayed, by the processor 120, via the display device 160 as it is or after being further processed.

According to an embodiment, the electronic device (e.g., the electronic device 101 of FIG. 1) may include a plurality of camera modules 680 having different attributes or functions. In such a case, at least one of the plurality of camera modules 680 may form, for example, a wide-angle camera and at least another of the plurality of camera modules 680 may form a telephoto camera. Similarly, at least one of the plurality of camera modules may form, for example, a front camera and at least another of the plurality of camera modules may form a rear camera.

According to various embodiments of the disclosure, the camera module 680 may include at least some of the camera modules 180, 200, 300, 405, 412, and 507 of FIGS. 1 to 17.

For example, the lens assembly 610 may include the barrel structure 202 or lens(es) 221 of FIG. 2 or 9, and the image sensor 630 may include the image sensor 206 in FIG. 2 or 9.

As described above, according to various embodiments of the disclosure, a camera module (e.g., the camera module 180, 200, 300, 405, 412, or 413 in FIGS. 1 to 15) and/or an electronic device including the same (e.g., the electronic device 101, 400, or 500 in FIG. 1 or FIGS. 14 to 17) may include a camera housing (e.g., the camera housing 201 in FIG. 2), a barrel structure (e.g., the barrel structure 202 in FIG. 2) including at least one lens (e.g., the lens 221 in FIG. 2) aligned along a first optical axis (e.g., the first optical axis O1 in FIG. 2) direction, the barrel structure being at least partially accommodated in the camera housing, a guide unit (e.g., the guide unit 203 in FIG. 2) at least partially accommodated in the camera housing and configured to guide the barrel structure to reciprocate along the first optical axis direction or reciprocate in a plane intersecting the first optical axis, a driving unit (e.g., the driving unit 204 in FIG. 2) including at least one coil (e.g., at least one of the coils 241*a*, 241*b*, and 241*c* in FIG. 2) and at least one magnet (e.g., at least one of the magnets 243*a*, 243*b*, and 243*c* in FIG. 2) disposed to at least partially face the at least one coil in a direction intersecting the first optical axis, a reflective member (e.g., the reflective member 205 in FIG. 2) at least partially accommodated in the camera housing and configured to refract or reflect light incident through the at least one lens in a second optical axis (e.g., the second optical axis O2 in FIG. 2) direction intersecting the first optical axis, and an image sensor (e.g., the image sensor 206 in FIG. 2) disposed on the camera housing, aligned with the reflective member in the second optical axis direction, and configured to receive the light refracted or reflected by the reflective member. The at least one coil or the at least one magnet may be disposed at a position at least partially facing the reflective member in a direction intersecting the first optical axis.

According to various embodiments of the disclosure, the driving unit may include a first coil (e.g., the first coil 241*a* in FIG. 2) provided as one of the at least one coil and disposed on the camera housing, a first magnet (e.g., the first magnet 243*a* in FIG. 2) provided as one of the at least one magnet and disposed on the guide unit, at least one second coil (e.g., at least one of the second coils 241*b* and 241*c* in FIG. 2) provided as another one of the at least one coil and disposed on the camera housing or the guide unit, and at least one second magnet (e.g., at least one of the second magnets 243*b* and 243*c* in FIG. 2) provided as another one of the at least one magnet and disposed on the barrel structure. The driving unit may be configured to generate a driving force for making the guide unit reciprocate in the first optical axis direction based on an electric signal applied to the first coil, and to generate a driving force for making the barrel structure reciprocate in a plane intersecting the first optical axis based on an electric signal applied to the at least one second coil.

According to various embodiments of the disclosure, the reflective member may be at least partially disposed between the first coil and the at least one second coil, or may be disposed between the image sensor and the at least one second coil.

According to various embodiments of the disclosure, the guide unit may include a first guide member (e.g., the first guide member 203*a* in FIG. 2) accommodated in the camera housing and configured to reciprocate with respect to the camera housing along the first optical axis direction, and a second guide member (e.g., the second guide member 203*b* in FIG. 2) disposed on the first guide member and configured to reciprocate with respect to the first guide member in a plane intersecting the first optical axis in a first direction (e.g., the first direction D1 in FIGS. 2 to 4). The barrel structure may be disposed on the second guide member, and may be configured to reciprocate with respect to the second guide member in the plane intersecting the first optical axis in a second direction (e.g., the second direction D2 in FIGS. 2 to 4) intersecting the first direction.

According to various embodiments of the disclosure, the driving unit may include a first coil provided as one of the at least one coil and disposed on the camera housing, a first magnet provided as one of the at least one magnet and disposed on the first guide member, a pair of second coils, each of which is provided as one of the at least one coil, the pair of second coils being disposed on the camera housing, and a pair of second magnets, each of which is provided as one of the at least one magnet, the pair of second magnets being disposed on the barrel structure. The driving unit may be configured to generate a driving force for making the first guide member reciprocate in the first optical axis direction based on an electric signal applied to the first coil and to generate a driving force for making the barrel structure to reciprocate in the first direction or the second direction based on an electric signal applied to at least one of the second coils.

According to various embodiments of the disclosure, the reflective member may be at least partially disposed between the first coil and one of the second coils or may be disposed between the image sensor and another one of the second coils.

According to various embodiments of the disclosure, the camera housing may include a base member (e.g., the base member 201*a* in FIG. 2) including a bottom surface (e.g., the bottom surface 211*a* in FIG. 2) and a plurality of side walls (e.g., the side walls 213*a*, 213*b*, 213*c*, and 213*s* in FIG. 2) extending from the bottom surface, and a cover member (e.g., the cover member 201*b* in FIG. 2) coupled to wrap at least a portion of the base member. The cover member may be configured to provide an electromagnetic shield structure.

According to various embodiments of the disclosure, the reflective member may be at least partially disposed between the bottom surface and the barrel structure.

According to various embodiments of the disclosure, the above-described camera module and/or the electronic device including the same may further include a holder (e.g., the holder 259 in FIG. 2) configured to be at least partially disposed inside the base member through the bottom surface, and the reflective member may be accommodated inside the base member or the camera housing in the state of being disposed in the holder.

According to various embodiments of the disclosure, the image sensor may be disposed on one of the plurality of side walls (e.g., the first side wall 213*a* in FIG. 2).

According to various embodiments of the disclosure, the above-described camera module and/or the electronic device including the same may further include a holder (e.g., the holder 359 in FIG. 9) configured to be at least partially disposed inside the base member through at least one of the plurality of side walls (e.g., the first side wall 213*a* in FIG. 2), and the reflective member of the image sensor may be disposed in the base member or the camera housing in the state of being disposed in the holder.

According to various embodiments of the disclosure, the driving unit may include a first coil provided as one of the at least one coil and disposed on one of the plurality of side walls, a second coil (e.g., one of the second coils 241*b* and 241c in FIG. 2) provided as another one of the at least one coil and disposed on another one of the plurality of side walls to face the first coil with at least a portion of the reflective member interposed therebetween, and a third coil (e.g., another one of the second coils 241b and 241c in FIG. 2) provided as another one of the at least one coil and disposed on another one of the plurality of side walls to face the image sensor with at least a portion of the reflective member interposed therebetween.

According to various embodiments of the disclosure, the driving unit may be configured to generate a driving force for making the guide unit reciprocate in the first optical axis direction based on an electric signal applied to the first coil, and to generate a driving force for making the barrel structure reciprocate in a plane intersecting the first optical axis based on an electric signal applied to at least one of the second coil and the third coil.

According to various embodiments of the disclosure, the above-described camera module and/or the electronic device including the same may further include an infrared cut filter (e.g., the infrared cut filter 263 in FIG. 7 or 8) disposed between the reflective member and the image sensor.

According to various embodiments of the disclosure, the above-described camera module and/or the electronic device including the same may further include at least one other lens (e.g., the lens indicated by "221a" in FIG. 7 or 8) disposed between the reflective member and the image sensor.

According to various embodiments of the disclosure, an electronic device (e.g., the electronic device 101, 400, or 500 in FIGS. 1, and 14 to 17) according to various embodiments of the disclosure may include a processor (e.g., the processor 120 in FIG. 1) and a camera module (e.g., the camera module 180, 200, 300, 405, 412, or 413 in FIGS. 1 to 15). The camera module may include a camera housing (e.g., the camera housing 201 in FIG. 2), a barrel structure (e.g., the barrel structure 202 in FIG. 2) including at least one lens (e.g., the lens 221 in FIG. 2) aligned along a first optical axis (e.g., the first optical axis O1 in FIG. 2) direction, the barrel structure being at least partially accommodated in the camera housing, a guide unit (e.g., the guide unit 203 in FIG. 2) at least partially accommodated in the camera housing and configured to guide the barrel structure to reciprocate along the first optical axis direction or reciprocate in a plane intersecting the first optical axis, a driving unit (e.g., the driving unit 204 in FIG. 2) including at least one coil (e.g., at least one of the coils 241a, 241b, and 241c in FIG. 2) and at least one magnet (e.g., the magnets 243a, 243b, and 243c in FIG. 2) disposed to at least partially face the at least one coil in a direction intersecting the first optical axis, a reflective member (e.g., the reflective member 205 in FIG. 2) at least partially accommodated in the camera housing in a state of at least partially facing the at least one coil or the at least one magnet in a direction intersecting the first optical axis, the reflective member being configured to refract or reflect light incident through the at least one lens in a second optical axis (e.g., the second optical axis O2 in FIG. 2) direction intersecting the first optical axis, and an image sensor (e.g., the image sensor 206 in FIG. 2) disposed on the camera housing, aligned with the reflective member in the second optical axis direction, and configured to receive the light refracted or reflected by the reflective member. The processor may be configured to apply an electric signal to the at least one coil to make the guide unit and the barrel structure reciprocate in the first optical axis direction or to make the barrel structure reciprocate with respect to the guide unit in a plane intersecting the first optical axis, and to acquire a subject image based on light received by the image sensor.

According to various embodiments of the disclosure, the processor may be configured to adjust a focal length or focus of the camera module by making the barrel structure reciprocate in the first optical axis direction.

According to various embodiments of the disclosure, the guide unit may include a first guide member (e.g., the first guide member 203a in FIG. 2) accommodated in the camera housing and configured to reciprocate with respect to the camera housing along the first optical axis direction, and a second guide member (e.g., the second guide member 203b in FIG. 2) disposed on the first guide member and configured to reciprocate with respect to the first guide member in a plane intersecting the first optical axis in a first direction (e.g., the first direction D1 in FIGS. 2 to 4). The barrel structure may be disposed on the second guide member, and may be configured to reciprocate with respect to the second guide member in the plane intersecting the first optical axis in a second direction (e.g., the second direction D2 in FIGS. 2 to 4) intersecting the first direction.

According to various embodiments of the disclosure, the driving unit may include a first coil (e.g., the first coil 241a in FIG. 2) provided as one of the at least one coil and disposed on the camera housing, a first magnet (e.g., the first magnet 243a in FIG. 2) provided as one of the at least one magnet and disposed on the first guide member, a pair of second coils (e.g., the second coils 241b and 241c in FIG. 2) each of which is provided as one of the at least one coil, the pair of second coils being disposed on the camera housing, and a pair of second magnets (e.g., the second magnets 243b and 243c in FIG. 2) provided as another one of the at least one magnet, the pair of second magnets being disposed on the barrel structure. The processor may be configured to generate a driving force for making the first guide member reciprocate in the first optical axis direction by applying an electric signal to the first coil and to generate a driving force for making the barrel structure to reciprocate in the first direction or the second direction by applying an electric signal to at least one of the second coils.

According to various embodiments of the disclosure, the reflective member may be at least partially disposed between the first coil and one of the second coils or may be disposed between the image sensor and another one of the second coils.

According to various embodiments of the disclosure, a camera module (e.g., the camera module 180, 200, 300, 405, 412, or 413 in FIGS. 1 to 15) and/or an electronic device including the same (e.g., the electronic device 101, 400, or 500 in FIG. 1 or FIGS. 14 to 17) may include a camera housing (e.g., the camera housing 201 in FIG. 2), a barrel structure (e.g., the barrel structure 202 in FIG. 2) including at least one lens (e.g., the lens 221 in FIG. 2) aligned along a first optical axis (e.g., the first optical axis O1 in FIG. 2) direction, the barrel structure being at least partially accommodated in the camera housing, a guide unit (e.g., the guide unit 203 in FIG. 2) at least partially accommodated in the camera housing and configured to guide the barrel structure to reciprocate along the first optical axis direction or reciprocate in a plane intersecting the first optical axis, a driving unit (e.g., the driving unit 204 in FIG. 2) including at least one coil (e.g., at least one of the coils 241a, 241b, and 241c in FIG. 2) and at least one magnet (e.g., the magnets 243a, 243b, and 243c in FIG. 2) disposed to at least partially face the at least one coil in a direction intersecting the first optical axis, a reflective member (e.g., the reflective member 205 in FIG. 2) at least partially accommodated in the camera housing and configured to refract or reflect light incident through the at least one lens in a second optical axis direction intersecting the first optical axis, and an image sensor (e.g., the image sensor 206 in FIG. 2) disposed on the camera housing, aligned with the reflective member in the second optical axis direction, and configured to receive the light refracted or reflected by the reflective member. The driving unit may include a first coil (e.g., the first coil 241a in FIG. 2) provided as one of the at least one coil and disposed on the camera housing, a first magnet (e.g., the first magnet 243a in FIG. 2) provided as one of the at least one magnet and disposed on the guide unit, at least one second coil (e.g., at least one of the second coils 241b and 241c in FIG. 2) provided as another one of the at least one coil and disposed on the camera housing or the guide unit, and at least one second coil (e.g., at least one of the second magnets 243b and 243c in FIG. 2) provided as another one of the at least one magnet and disposed on the barrel structure. The driving unit may be configured to generate a driving force for making the guide unit reciprocate in the first optical axis direction based on an electric signal applied to the first coil, and to generate a driving force for making the barrel structure reciprocate in a plane intersecting the first optical axis based on an electric signal applied to the at least one second coil. The barrel structure may be configured to reciprocate in the first optical axis direction together with the guide unit or to reciprocate in a plane intersecting the first optical axis under the guidance of the guide unit, and the reflective member may be at least partially disposed between the first coil and the at least one second coil, or may be disposed between the image sensor and the at least one second coil.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A camera module comprising:
   a camera housing;
   a barrel structure comprising at least one lens aligned along a first optical axis direction and at least partially accommodated in the camera housing;
   a guide unit at least partially accommodated in the camera housing and configured to guide the barrel structure to reciprocate along the first optical axis direction or reciprocate in a plane intersecting a first optical axis;
   a driving unit including a first coil disposed on the camera housing, a first magnet disposed on the guide unit to at least partially face the first coil in a direction intersecting the first optical axis, second coils provided disposed on the camera housing or the guide unit, and second magnets disposed on the barrel structure to at least partially face corresponding one of the second coils in a direction intersecting the first optical axis;
   a reflective member at least partially accommodated in the camera housing and configured to refract or reflect light incident through the at least one lens in a second optical axis direction intersecting the first optical axis; and
   an image sensor disposed on the camera housing, aligned with the reflective member in the second optical axis direction, and configured to receive the light refracted or reflected by the reflective member,
   wherein the reflective member is at least partially disposed between the first coil and one of the second coils.

2. The camera module of claim 1,
   wherein the driving unit is configured to:
   generate a driving force for making the guide unit reciprocate in the first optical axis direction based on an electric signal applied to the first coil, and
   generate a driving force for making the barrel structure reciprocate in a plane intersecting the first optical axis based on an electric signal applied to the at least one second coil.

3. The camera module of claim 1, wherein the reflective member is at least partially disposed between the image sensor and another one of the second coils.

4. The camera module of claim 1,
   wherein the guide unit comprises:
   a first guide member accommodated in the camera housing and configured to reciprocate with respect to the camera housing along the first optical axis direction, and
   a second guide member disposed on the first guide member and configured to reciprocate with respect to the first guide member in a plane intersecting the first optical axis in a first direction, and
   wherein the barrel structure is disposed on the second guide member and is configured to reciprocate with respect to the first guide member in a plane intersecting the first optical axis in a second direction intersecting the first direction.

5. The camera module of claim 4,
   wherein the first magnet is disposed on the first guide member,
   wherein a pair of the second coils are disposed on the camera housing, and
   wherein a pair of the second magnets are disposed on the barrel structure.

6. The camera module of claim 1,
   wherein the camera housing comprises:
   a base member comprising a bottom surface and a plurality of side walls extending from the bottom surface, and
   a cover member coupled to wrap at least a portion of the base member, and
   wherein the cover member is configured to provide an electromagnetic shield structure.

7. The camera module of claim 6, wherein the reflective member is at least partially disposed between the bottom surface and the barrel structure.

8. The camera module of claim 6, further comprising:
   a holder configured to be at least partially disposed inside the base member through the bottom surface,
   wherein the reflective member is accommodated inside the base member or the camera housing in a state of being disposed in the holder.

9. The camera module of claim 8, wherein the image sensor is disposed on one of the plurality of side walls.

10. The camera module of claim 9, further comprising:
    a holder configured to be at least partially disposed inside the base member through one of the plurality of side walls,
    wherein the reflective member of the image sensor is disposed in the base member or the camera housing in the state of being disposed in the holder.

11. The camera module of claim 6,
    wherein the
    first coil is disposed on one of the plurality of side walls and one of the second coils is disposed on another one of the plurality of side walls to face the first coil with at least a portion of the reflective member interposed therebetween, and another one of the second coils is disposed on still another one of the plurality of side walls to face the image sensor with at least a portion of the reflective member interposed therebetween.

12. The camera module of claim 11, wherein the driving unit is configured to:

generate a driving force for making the guide unit reciprocate in the first optical axis direction based on an electric signal applied to the first coil, and generate a driving force for making the barrel structure reciprocate in a plane intersecting the first optical axis based on an electric signal applied to at least one of the second coils.

13. The camera module of claim 1, further comprising:

at least one still other lens disposed between the reflective member and the image sensor.

14. An electronic device comprising:

at least one processor; and a camera module comprising:

a camera housing;

a barrel structure comprising at least one lens aligned along a first optical axis direction and at least partially accommodated in the camera housing;

a guide unit at least partially accommodated in the camera housing and configured to guide the barrel structure to reciprocate along the first optical axis direction or reciprocate in a plane intersecting a first optical axis;

a driving unit including a first coil disposed on the camera housing, a first magnet disposed on the guide unit to at least partially face the first coil in a direction intersecting the first optical axis, second coils provided disposed on the camera housing or the guide unit, and second magnets disposed on the barrel structure to at least partially face corresponding one of the second coils in a direction intersecting the first optical axis;

a reflective member at least partially accommodated in the camera housing and configured to refract or reflect light incident through the at least one lens in a second optical axis direction intersecting the first optical axis; and an image sensor disposed on the camera housing, aligned with the reflective member in the second optical axis direction, and configured to receive the light refracted or reflected by the reflective member, wherein the reflective member is at least partially disposed between the first coil and one of the second coils, and wherein the at least one processor is configured to:

apply an electric signal to the at least one coil to make the guide unit and the barrel structure reciprocate in the first optical axis direction or to make the barrel structure reciprocate with respect to the guide unit in a plane intersecting the first optical axis, and acquire a subject image based on light received by the image sensor.

15. The electronic device of claim 14, wherein the at least one of the first coil and the second coils is disposed at a position at least partially facing the reflective member in a direction intersecting the first optical axis.

* * * * *